(12) United States Patent
Sato et al.

(10) Patent No.: US 6,574,570 B1
(45) Date of Patent: Jun. 3, 2003

(54) METHOD FOR ANALYZING NONLINEAR RESTORING FORCE CHARACTERISTIC WITH HYSTERESIS OF MACHINE STRUCTURE SYSTEM

(75) Inventors: Hisayoshi Sato, Tokyo (JP); Hisashi Osumi, Tokyo (JP); Naruhiro Irino, Yono (JP)

(73) Assignee: Chuo University, Tokyo (JP)

( * ) Notice: Subject to any disclaimer, the term of this patent is extended or adjusted under 35 U.S.C. 154(b) by 0 days.

(21) Appl. No.: 09/940,803

(22) Filed: Aug. 29, 2001

(30) Foreign Application Priority Data

Mar. 5, 2001 (JP) ........................................ 2001-060958

(51) Int. Cl.[7] ................................................. G01L 1/00
(52) U.S. Cl. ....................................................... 702/41
(58) Field of Search ........................................... 702/41

(56) References Cited

U.S. PATENT DOCUMENTS 5,159,563 A * 10/1992 Miller et al. ................. 340/683
5,688,103 A * 11/1997 Tsuji et al. .................. 198/464.1
6,330,827 B1 * 12/2001 Johnson et al. ............... 73/579

* cited by examiner

Primary Examiner—John Barlow
Assistant Examiner—Anthony T. Dougherty
(74) Attorney, Agent, or Firm—Oliff & Berridge, PLC

(57) ABSTRACT

The invention discloses a method for analyzing nonlinear restoring force characteristic with hysteresis of a machine structure system, capable of easily and high-accurately performing analysis of nonlinear vibration characteristic of the machine structure system having a displacement strain characteristic dependent on a past history. When analysis is performed for the nonlinear restoring force characteristic of the machine structure system, having force-displacement hysteresis, approximate mode analysis is carried out by representing the nonlinear restoring force characteristic having the history by an equivalent linear characteristic.

2 Claims, 20 Drawing Sheets

FIG. 1

STEP 1 to 5: MAKE PREISACH MODEL BY DATA PROCESSING WITH PC

STEPS 6 AND 7: OBTAIN EQUIVALENT RIGIDITY AND EQUIVALENT DAMPING COEFFICIENT BY EQUIVALENT LINEARIZATION METHOD

STEPS 8 AND 9: SOLVE NONLINEAR SIMULTANEOUS EQUATION BY SUBSTITUTING EQUIVALENT RIGIDITY AND EQUIVALENT DAMPING FOR EQUATION OF MOTION OF MULTI-DEGREE-OF-FREEDOM SYSTEM

STEPS 10: OBTAIN FREQUENCY RESPONSE CHARACTERISTIC $x_d - x_i$ PLANE $x_d - x_i$ PLANE

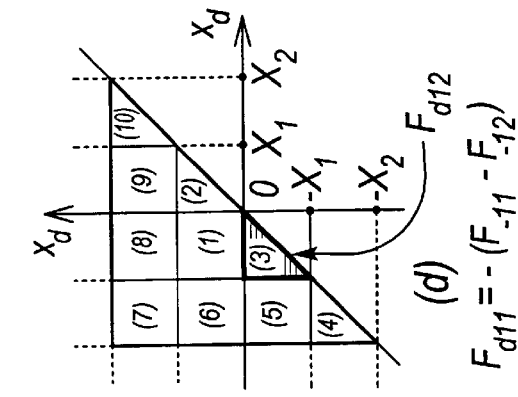
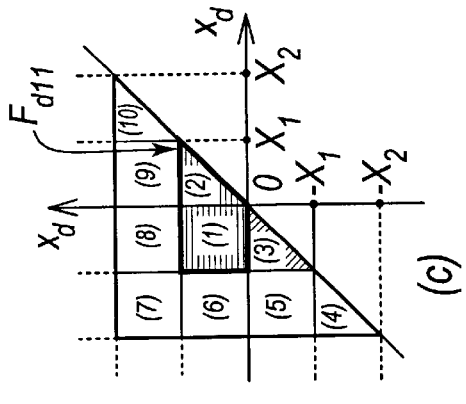
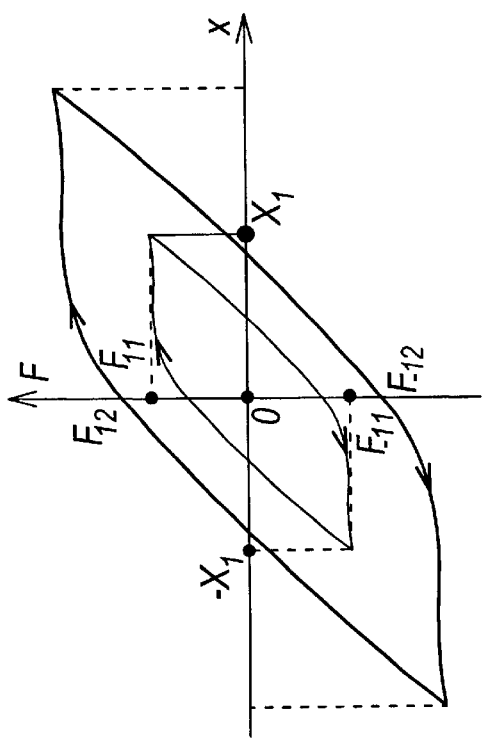
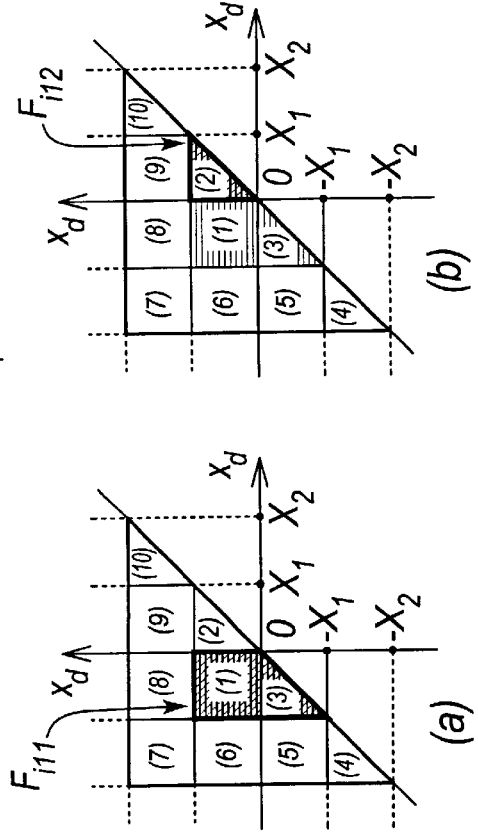
FIG.12

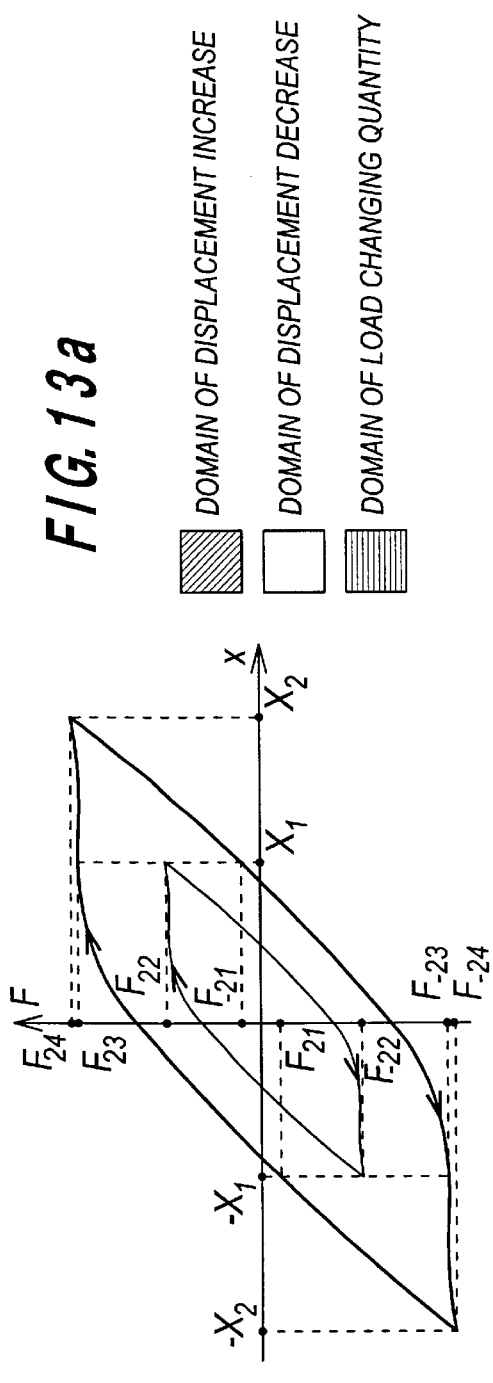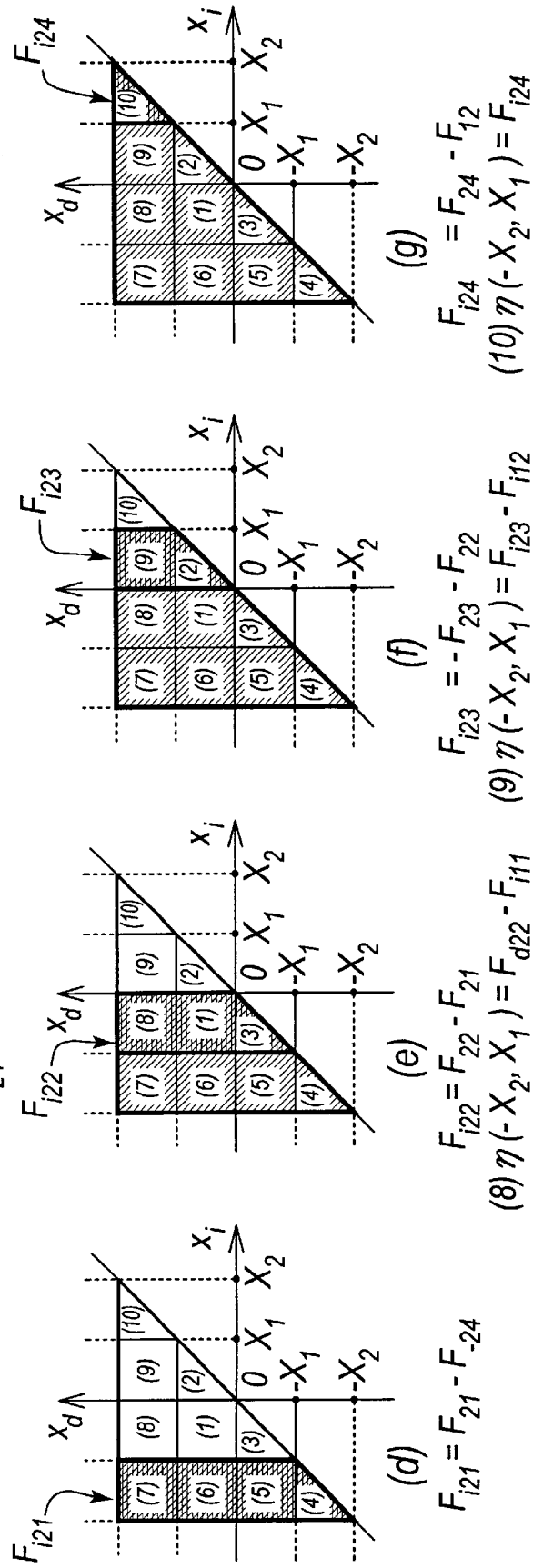
FIG.13a

METHOD FOR ANALYZING NONLINEAR RESTORING FORCE CHARACTERISTIC WITH HYSTERESIS OF MACHINE STRUCTURE SYSTEM

BACKGROUND OF THE INVENTION

1. Field of the Invention

This invention relates to an approximate mode analysis method (method of approximate modal analysis) to analyze nonlinear restoring force characteristic with force-displacement hysteresis of a machine structure system. More particularly, the invention relates to the method of analysis for improving the vibration characteristic of the machine structure system by reconstructing a hysteretic characteristic using the data of a discrete load strain characteristic obtained experimentally by a vibration test or the like, alternatively, simulatively by a finite element method (FEM) analysis or the like, and by supplying an output according to the obtained data with respect to an arbitrary input.

2. Description of the Related Art

The mode analysis method has been established for its technology as a method for analyzing the vibration of the machine structure system, and has also been made commercially available as software, and frequently used. However, while the mode analysis method itself is based on a theory assuming a linear system, an actual machine structure system normally includes a plurality of nonlinear characteristics, in a bolt joined part, a sliding surface part of a baring or the like, a rotational part, a rubber pad of an engine mount as shown in FIG. 19, a joint of a robot, and so on.

With regard to a case including a nonlinear characteristic having no hysteretic characteristic, presented is a method for approximately achieving mode analysis by representing the nonlinear characteristic by an equivalent linearization method. This method has contributed to the rigidity designing and the working accuracy improvement of a machine tool, the support characteristic evaluation of a piping system and reflection in an aseismic designing method, optimal designing in support at the engine mount, and so on.

However, a restoring force characteristic typically represented by the rubber pad exhibits hysteretic nonlinearity. Conventionally, it was difficult to reduce an error when the estimated value obtained by estimating the frequency response characteristic of the machine structure system including such a nonlinear characteristic in a designing stage was compared with the frequency response characteristic obtained by an experiment.

When a vibration characteristic is requested by considering a structure of element, a characteristic for connecting elements together, and so on, in the designing stage, generally, analysis is carried out by using the finite element method. However, for a vibration characteristic, analysis is carried out mainly based on time history, and to obtain a frequency response characteristic, time history response must be repeated for each frequency step. Thus, a great deal of computing time is required even for obtaining the response of the linear system In addition, it is also possible to obtain a frequency response characteristic from the equation of motion. Regarding the case including the nonlinear characteristic, however, no general and simple methods have been presented to obtain the vibration characteristic of the entire machine structure system by presenting the nonlinear characteristic.

By carrying out the vibration experiment of the machine structure system, a frequency response characteristic including the above characteristic is obtained. In the mode analysis method, this is called an experimental mode analysis. According to this method, a frequency response characteristic is obtained by an experiment, and the system characteristic is improved by estimating an intrinsic frequency, a damping constant, a mass, spring, damping coefficients, and so on.

However, if the nonlinear characteristic is included, a frequency response characteristic is obtained in a biased manner from a linear characteristic. Consequently, because of a biased frequency, distortion of a characteristic in the vicinity of the intrinsic frequency, and so on, it is difficult to estimate an intrinsic frequency, and generally, a damping constant is excessively evaluated. As a result, wrong treatment has been taken for an improvement of the characteristic, or no proper treatment has been taken therefor.

With regard to nonlinear restoring force characteristic without hysteresis, a plural nonlinear simultaneous equation can be constructed by applying the equivalent linearization method to a multi-degree-of-freedom system equation of motion. It has been considered possible to find a solution of the equation, i.e., the frequency response characteristic of the multi-degree-of-freedom system including a plurality of nonlinear characteristics. In addition, by using a building block method (BB method) connected with the finite element method to connect the vibration characteristic of the device structure by the nonlinear restoring force characteristic, it has been considered possible to approximately carry out the mode analysis of the multi-degree-of-freedom nonlinear vibration system on the extension of the conventional mode analysis method.

However, the foregoing method was unable to deal with the system including the nonlinear restoring force characteristic with hysteresis, as typically seen in the rubber pad used when an automotive engine was mounted on a car body. In addition, the nonlinear characteristic of a bearing and the like was often represented by hysteretic nonlinear characteristic, and it was impossible to deal with this characteristic.

In the vibration characteristic analysis of the mechanical system, for the method of representing a hysteretic characteristic in a rigid part, a model for representing the hysteretic characteristic by a combination of divisional straight lines, such as bilinear model, a trilinear model or the like, a hysteretic characteristic model for representing it by a numerical expression, such as Ramberg-Osgood type, and so on, have been used. However, considering the simulation of the nonlinear characteristic of an actual machine based on the characteristics of such models, problems described below inevitably occur.

Each of the bilinear and trilinear models is a method for representing a hysteretic characteristic by the combination of straight lines. In these methods, the hysteretic characteristics to be represented are considered to be two and three inclined straight lines in sections respectively in the bilinear and trilinear models, and the shapes of the hysteretic characteristics are simulated by joining the straight lines over sections. A problem inherent in each of these methods is that since the hysteretic characteristic to be presented takes a complex shape, it cannot be sufficiently represented by the sectional combination of two to three straight lines.

In addition, since the hysteretic characteristic to be represented is considered to be two to three inclined straight lines, the inclination is changed piecewise. Consequently, even when the hysteretic characteristic to be represented takes a smooth shape, the sectional change of the inclination causes an output from the model to become unsmooth with respect to an arbitrary input.

There is also a problem inherent in the case of representing the hysteretic characteristic by the bilinear model. That is, when sectional straight line regression is made with respect to the hysteretic characteristic to be represented, depending on the position of inclination changing to be set, an obtained result varies even if a similar hysteretic characteristic is represented.

On the other hand, the hysteretic characteristic model represented by the Ramberg-Osgood type is a method for representing a hysteretic characteristic by a polynomial. This method is designed to simulate the shape of the hysteretic characteristic by deciding maximum and minimum coordinates based on a skeleton curve, and by connecting upward and downward curves from the coordinates. To represent the hysteretic characteristic by this method, it is necessary to match the hysteretic characteristic to be represented with the hysteretic characteristic model by using a least square method or-the like. However, when the hysteretic characteristic obtained from the vibration test, FEM analysis, or the like has a complex shape, it is difficult to set a parameter to match the characteristic in detail with the curve-matched hysteretic characteristic model.

Moreover, in the system represented by the hysteretic characteristic model of the Ramberg-Osgood type, for performing approximate vibration characteristic analysis by the equivalent linearization method, it is necessary to calculate Fourier series of an output with respect to an arbitrary input, as an approximation of a nonlinear factor. However, depending on a parameter for representing this model, it may be difficult to analytically calculate Fourier series.

A difference in equivalent rigidity and equivalent damping depending on the presence of a hysteretic characteristic is that while there is neither phase delay nor advancement in a relation between an input and an output in the case of absence of hysteretic characteristics, in the case of the presence of a hysteretic characteristic, a phase relation is included in a relation between an input and an output, and this need be considered when united with the equation of motion.

With regard to the representation of nonlinear hysteretic characteristic by a describing function (equivalent linearization method in the field of automatic control), in the field of an electric system, when the characteristics of a current and a magnetic field were taken into consideration, it was considered possible to numerically represent the characteristics by the describing function based on actual characteristics. However, for the application to the multi-degree-of-freedom system and the representation of the frequency response characteristic as mode analysis as seen in the machine structure system, no particular solution of a plural nonlinear simultaneous equation having a phase characteristic from the beginning has been presented, except for an area targeted from a mathematical interest.

For performing vibration characteristic analysis of the nonlinear system having a displacement strain characteristic dependent on a past history, it was necessary to apply the straight line regression, the least square method, or the like to the foregoing hysteretic characteristic model. Thus, it was difficult to match, in detail, the shape of the hysteretic characteristic model used for analysis with the data of the hysteretic characteristic obtained from the vibration test, the FEM analysis, or the like to be applied, and this point was a problem when vibration characteristic analysis was carried out.

SUMMARY OF THE INVENTION

The present invention was made to advantageously solve the foregoing problems. In accordance with the invention, a method of analysis is provided for the representation of the vibration characteristic of a machine structure system having nonlinear restoring force characteristic with hysteresis by a frequency response characteristic, the method of analysis making approximate mode analysis enable to be performed by representing the vibration characteristic numerically by equivalent rigidity and equivalent damping based on the nonlinear characteristic of an actual system, and by uniting such with a multi-degree-of-freedom equation of motion and obtaining a solution of the equation. This method contributes to the evaluation and improvement of the vibration characteristic of the machine structure system. As a result, it is possible not only to predict the characteristic of the system in a designing stage, but also to estimate a vibration system parameter more accurately and rationally from the vibration characteristic obtained by the vibration experiment of the actual system.

According to the invention, without using the method of representing a hysteretic characteristic based on the application of hysteretic characteristic data obtained from a vibration test or the like to a certain model, an output is made according to the obtained hysteretic characteristic with respect to an arbitrary input, based on the obtained hysteretic characteristic data. For such a purpose, Preisach model designed for recording a magnetic characteristic in an electric and electronic field is used to make a hysteretic characteristic model regarding the load strain of the mechanical system. Moreover, a mechanical vibration characteristic analysis including a test characteristic is performed by using this hysteretic characteristic representing method.

When a hysteretic characteristic model obtained from the vibration test or the like is made by the Preisach model, since this model includes many relay elements, it is necessary to measure a minor loop constituting this hysteretic characteristic model. However, the measurement of the minor loop of the hysteretic characteristic by the vibration test may be difficult. In addition, there is a problem when the hysteretic characteristic model obtained by the invention is used for vibration characteristic analysis. That is, when an equivalent linearization method is used because the hysteretic characteristic is numerically represented, it is impossible to analytically obtain equivalent rigidity obtained by Fourier transformation. Thus, according to the invention, equivalent rigidity is numerically obtained, and used for analysis.

According to the invention, when a solution is found to the nonlinear equation of motion of the system by Newton-Raphson method, data is obtained on the equivalent rigidity of a nonlinear factor, and this data is interpolated by a piecewise polynomial such as a spline function or the like. The spline function represented by the piecewise polynomial can be differentiated. Thus, Jacobian matrix is formed when Newton-Raphson method is applied. This process develops an output to the hysteretic characteristic in Fourier series by using a solution obtained for each repetition, making it possible to achieve high efficiency for the method of obtaining equivalent rigidity and equivalent damping.

According to the invention, the vibration characteristic analysis including the hysteretic characteristic data obtained from the vibration test, FEM analysis, or the like, can be performed. Thus, it is possible to perform analysis more closely related to an experiment. Moreover, according to the hysteretic characteristic analysis method of the invention, even a nonlinear characteristic having no history can be analyzed from data obtained from the vibration test, the FEM analysis, or the like by a similar method.

The foregoing arrangements enable a frequency response characteristic to be clarified by taking, into the equation of motion, a nonlinear characteristic existing in a connected part between element structures in a machine tool or the like, a nonlinear characteristic provided in a bearing, a sliding surface part or the like, a nonlinear characteristic of a support component used for engine suspending, a nonlinear characteristic generated in a robot joint, and so on. Accordingly, the improvement of the characteristic and dealing with the characteristic based on the above considerations can be rationally pursued. Compared with the approximate mode analysis based on a consideration given to the nonlinear characteristic having no history, more accurate estimation can be made quickly by numerically representing the hysteretic characteristic by equivalent rigidity and equivalent damping and considering the same based on an actual characteristic.

Therefore, in an age where competition is severe in an automobile industry or the like, among nations, and between corporate groups, by solving the existing problems, it is possible to realize the prompt starting of production, and to quickly deal with problems which arise.

BRIEF DESCRIPTION OF THE DRAWINGS

FIG. 1 is a flowchart showing a process of a method of analysis according to an embodiment of the invention;

FIG. 4(a) showing a minimum factor of a hysteretic characteristic represented by a discrete value; FIG. 4(b) showing a hysteretic characteristic represented by a collection of minimum factors; and FIG. 4(c) showing an area, in which a distribution function is present on an $x_d$-$x_i$ plane;

FIG. 12 is a view illustrating a method for making a hysteretic characteristic model (amplitude $X_1$) by processing the vibration test data;

FIGS. 13(a) and 13(b) are views illustrating a method for making a hysteretic characteristic model (amplitude $X_2$) by processing the vibration test data;

DESCRIPTION OF THE PREFERRED EMBODIMENT

Next, the preferred embodiment of the present invention will be described with reference to the accompanying drawings.

Figure 2A:
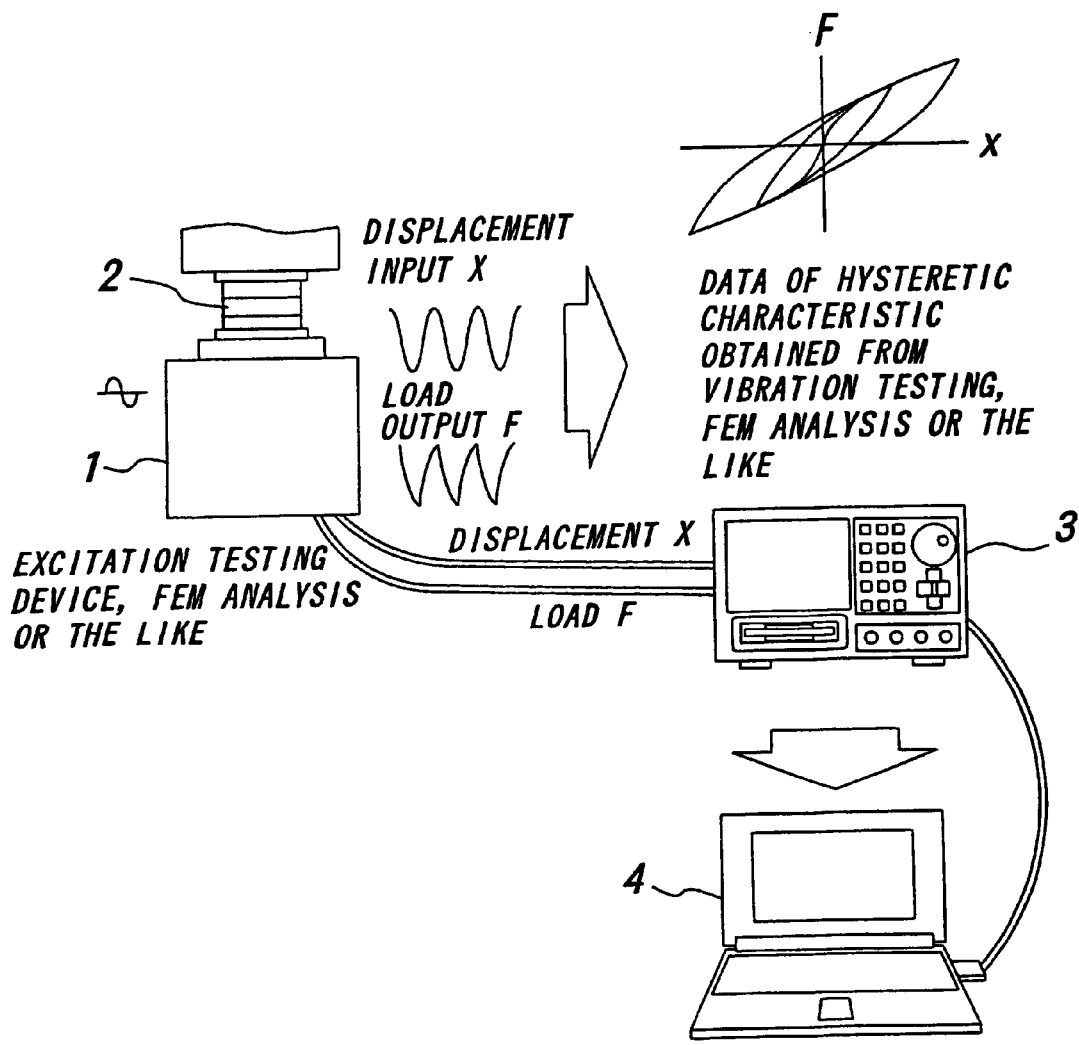
FIGS. 2(a) to 2(c) are views, each thereof illustrating a configuration of a system of analysis used for the method of analysis of the embodiment.
Figure 2B:
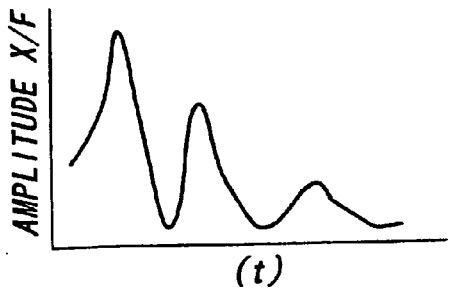
Figure 2C:
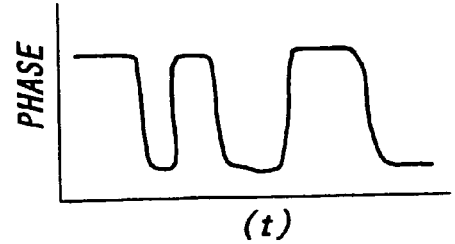

FIG. 1 is a flowchart showing a procedure of an analysis method according to an embodiment of the present invention; and each of FIGS. 2(a) to 2(c) is a view exemplifying a configuration of a system of analysis used for the analysis method of the embodiment. To give an outline of the analysis method of the embodiment, first, as shown in FIG. 2(a), data is obtained on a restoring force characteristic with hysteresis of a load output F with respect to an input displacement X by making an excitation experiment for a test piece 2 such as a rubber pad to be analyzed at the exciter 1 of an excitation testing device, and/or subjecting the test piece to simulation analysis (simulation by a computer) such as FEM analysis, and so on. The obtained data is then entered through an oscilloscope 3 to a personal computer (PC) 4. Then, as shown in FIG. 1, Preisach model is made by data processing of the PC 4, equivalent rigidity and an equivalent damping coefficient are obtained by an equivalent linearization method, and then the equivalent rigidity and the equivalent damping coefficient are substituted for an equation of motion of multi-degree-of-freedom system. By solving nonlinear simultaneous equations, for example, a frequency response characteristic like that shown in FIGS. 2(b) and 2(c) is obtained.

Specifically, according to the analysis method of the embodiment, when a hysteretic characteristic model is constructed, the data of the hysteretic characteristic regarding a load and strain obtained from a vibration test, FEM analysis or the like is processed by being divided into a case where the input displacement is increased and a case where the input displacement is decreased. In other words, the displacement X is divided into a displacement $x_i$ at the time of increase and $x_d$ at the time of decrease. A relation between the displacement X and a load F is represented based on these two variables of displacements $x_i$ and $x_d$, and a hysteretic characteristic model is made as discrete values by obtaining a change $\Delta F$ in the load with respect to changes in the increase and the decrease of the displacement.

Figure 3:
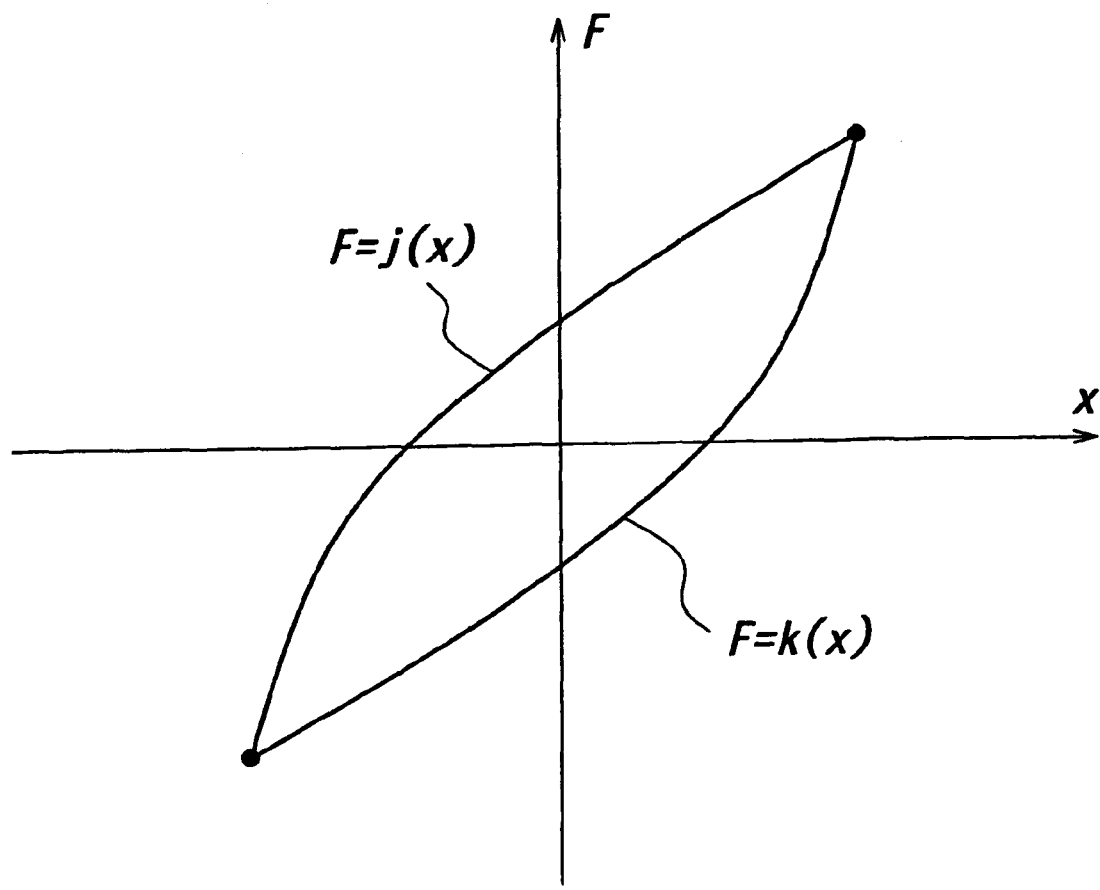
FIG. 3 is a characteristic view showing an example of nonlinear restoring force characteristic with hysteresis.

As shown in FIG. 3, regarding to the relation between the displacement and the load, if the load is represented by the following continuous function when the displacement is increased, $$F = j(x) \quad (1)$$

then the increase of the load F with respect to the displacement x is represented as follows:

$$\frac{dF}{dx} = j'(x) \qquad (2)$$

The equation (2) represents a slope of the relation between the displacement and the load. Similarly, when the displacement is decreased, if the relation between the load and the displacement is represented by the following continuous function, $$F = k(x) \qquad (3)$$

then the reduction of the load F with respect to the displacement x is represented as follows:

$$\frac{dF}{dx} = k'(x) \qquad (4)$$

Here, the displacement x is divided into displacement at the time of increase and displacement at the time of decrease respectively set as independent variables, and the displacements at the time of increase and at the time of decrease are respectively denoted by $x_i$ and $x_d$. A change in the load F with respect to the changes of the displacements $x_i$ and $x_d$ can be represented as follows:

$$\frac{\partial^2 F}{\partial x_i \partial x_d} = \eta(x_i, x_d) \qquad (5)$$

By integrating the equation (5) with respect to $x_d$, a result is the slope of the load with respect to the displacement at the time of displacement increase of the equation (2). Similarly, by integrating the equation (5) with respect to $x_i$, a result is the slope of the load with respect to the displacement at the time of displacement decrease of the equation (4). By integrating these results in the range of the increase and decrease changes of the displacement, then a load with respect to a given displacement is outputted. This $\eta(x_i, x_d)$ is called as Preisach distribution function.

Figure 4A:
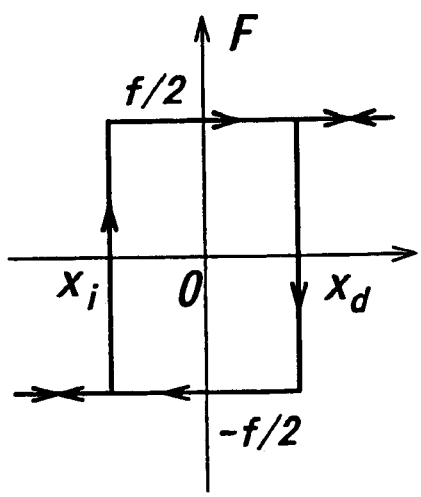
FIGS. 4(a) to 4(c) are illustrations.

When considered by discrete value, the Preisach distribution function becomes as follows. Consideration is given to a characteristic like that shown in FIG. 4(a), represented by providing three values, i.e., displacement values $x_i$, $x_d$ and a load value f. This is represented by $F=f(x_i, x_d)$.

(1) When a displacement satisfies $X<x_i$, $F=-f/2$ is established.
(2) When the displacement is further increased, $F=f/2$ is established at the point of $X=x_i$, and this state is maintained.
(3) When the displacement is decreased, $F=f/2$ is established with $X<x_d$.
(4) When the displacement is further decreased, $F=-f/2$ is established at the point of $X=x_d$, and this state is maintained.

Figure 4B:
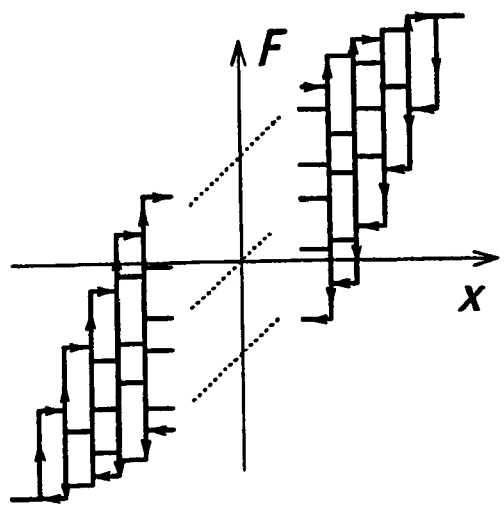

Now, assuming that one having the foregoing characteristic is a minimum factor of a hysteretic characteristic, and as shown in FIG. 4(b), the hysteretic characteristic is considered to be a collection of the minimum factors, represented as a square type.

Regarding the above hysteretic characteristic, considering that no reverse movements occur in routes during the increase and the decrease, if the maximum and minimum values of the displacement x of the characteristic are $X_s$ and $-X_s$, then the defined domain of the above $\eta(x_i, x_d)$ becomes as follows:

$$x_i \leq x_d, \; |x_i| \leq X_s, \; |x_d| \leq X_s \qquad (6)$$

Figure 4C:
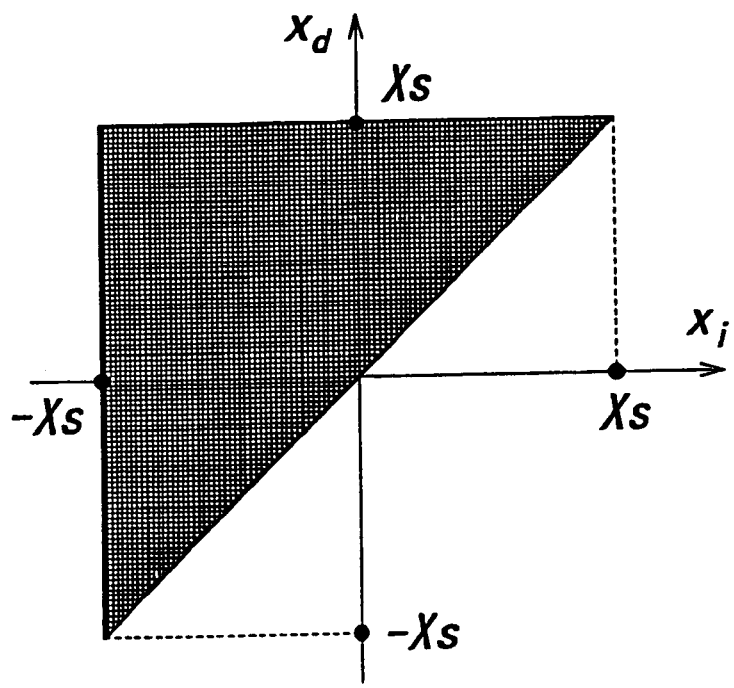
Figure 5:
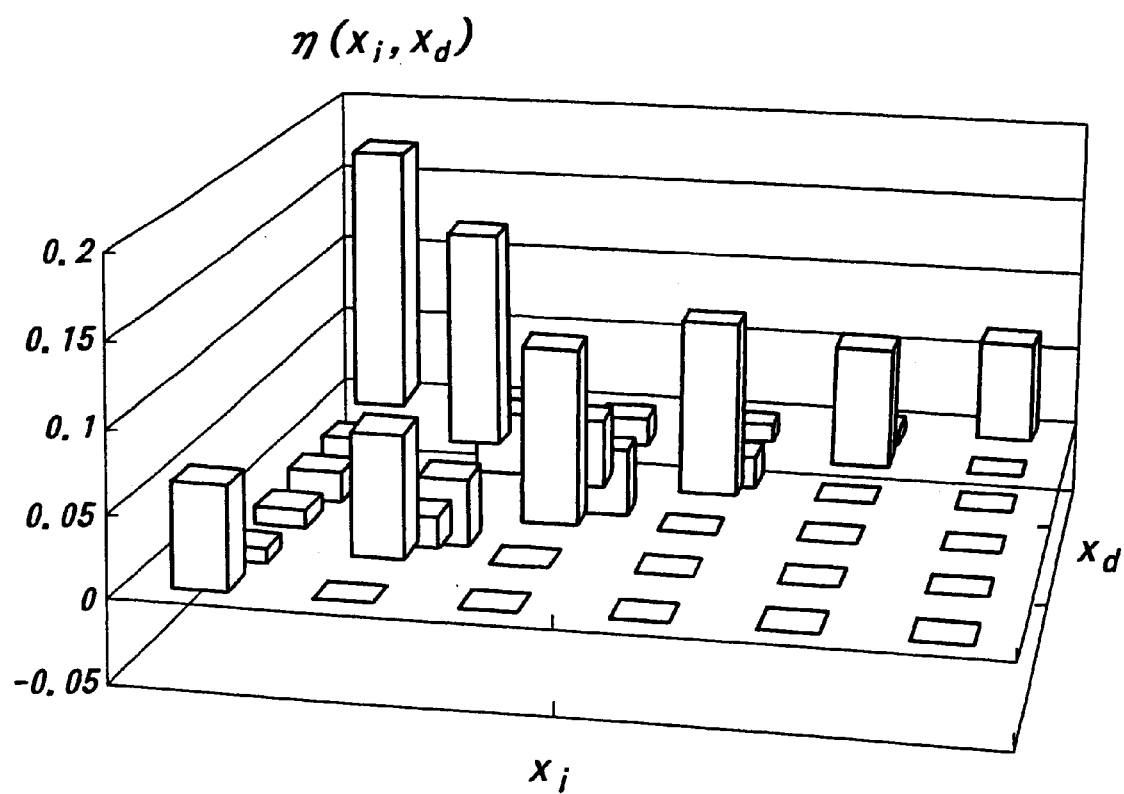
FIG. 5 is a view illustrating Preisach distribution function represented by a discrete value seen in a three-dimensional space.

When the Preisach distribution function is seen on a plane $x_i$-$x_d$, the defined domain of this distribution function becomes a triangular area like that shown in FIG. 4(c). FIG. 5 shows the Preisach distribution function seen in a three-dimensional space. (Change in load at time of displacement increase)

Now, the distribution function will be described by using the plane $x_i$-$x_d$. When the displacement is increased from X to $X+\Delta X(\Delta X>0)$, the sum of all the distribution functions $\eta(x_i, x_d)$ when the displacement $x_i$ at the time of increase is between X and $X+\Delta X$ becomes an increase $\Delta F$ of the load, which is represented as follows.

$$\Delta F = \int_{-X_s}^{X_s} dx_d \int_{X}^{X+\Delta X} \eta(x_i, x_d) dx_i \qquad (7)$$

Figure 6A:
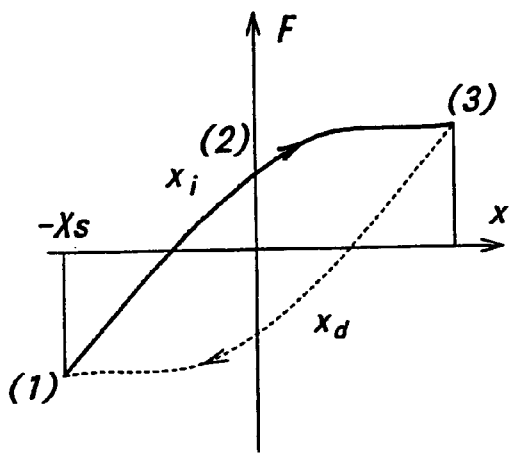
FIGS. 6(a) to 6(c) are views showing a change in a load when a displacement increases.
Figure 6B:
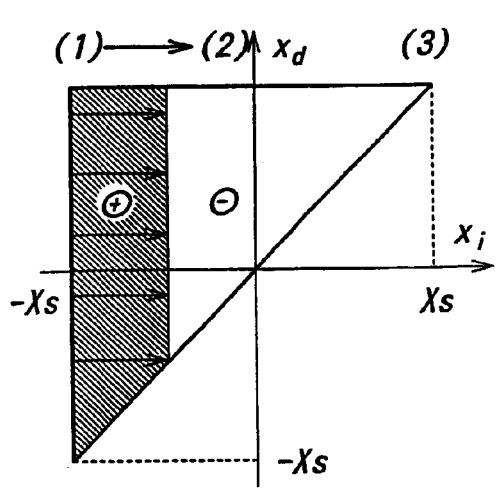
Figure 6C:
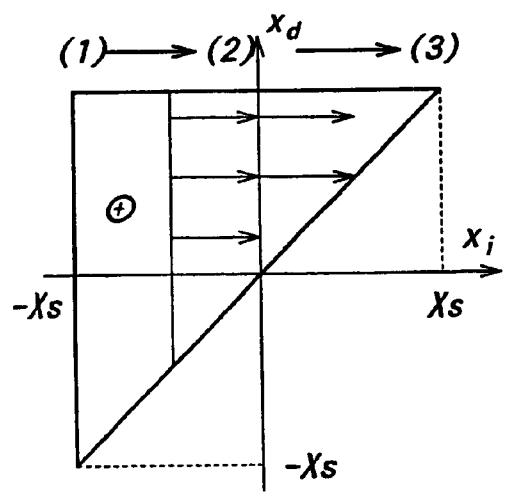

FIGS. 6(a) to 6(c) show a change in the integration domain of the distribution function at the time of displacement increase regarding the hysteretic characteristic of amplitude $X_s$. At the position of (1) in FIG. 6(a), the load F takes a minimum value $F_{min}$, which is represented as follows.

$$F_{min} = -\frac{1}{2}\int_{-X_s}^{X_s} dx_d \int_{-X_s}^{X_s} \eta(x_i, x_d) dx_i \qquad (8)$$

The sum of the $F_{min}$ and $\Delta F$ obtained by integrating $\eta(x_i, x_d)$ in the displacement increase region becomes a load F.

$$F = F_{min} + \int_{-X_s}^{X_s} dx_d \int_{X}^{X+\Delta X} \eta(x_i, x_d) dx_i \qquad (9)$$

A hatched part for integration is increased from the position of $-X_s$ of (1) to 0 of (2) in FIG. 6(b), and increased to $X_s$ of (3) in FIG. 6(c), becoming a maximum value $F_{max}$ of F. (Change in load at time of displacement decrease)

When the displacement is decreased from X to $X-\Delta X$, the sum of all the distribution functions $\eta(x_i, x_d)$ when the displacement $x_d$ at the time of decrease is between X and $X-\Delta X$ becomes a load reduction $\Delta F$, which is represented as follows.

$$\Delta F = \int_{X}^{X-\Delta X} dx_d \int_{-X_s}^{X_s} \eta(x_i, x_d) dx_i = -\int_{X-\Delta X}^{X} dx_d \int_{-X_s}^{X_s} \eta(x_i, x_d) dx_i \qquad (10)$$

Figure 7A:
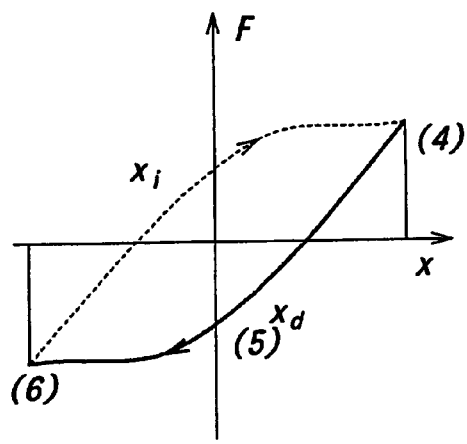
FIGS. 7(a) to 7(c) are views showing a change in a load when a displacement decreases.
Figure 7B:
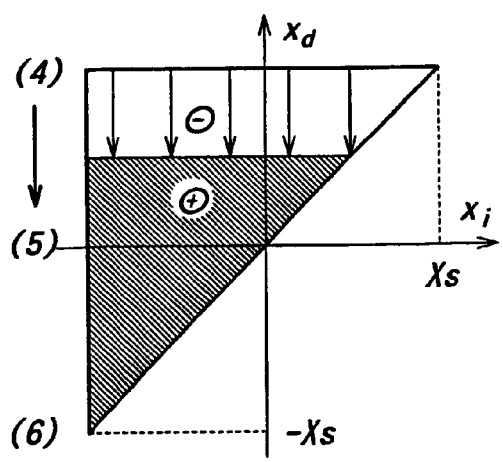
Figure 7C:
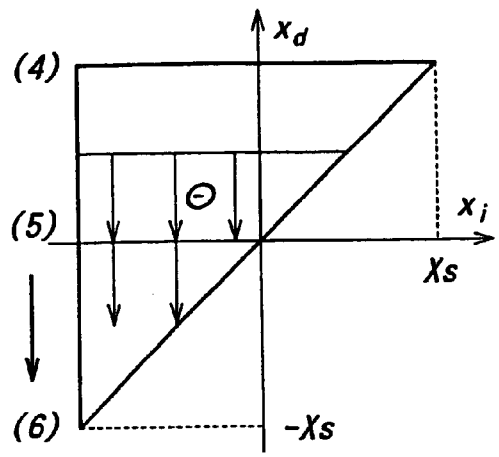

FIGS. 7(a) to 7(c) show a change in the integration domain of the distribution function at the time of displacement decrease. The load F takes a maximum value $F_{max}$ at the position of (4) in FIG. 7(a), which is represented as follows.

$$F_{max} = \frac{1}{2}\int_{-X_s}^{X_s} dx_d \int_{-X_s}^{X_s} \eta(x_i, x_d) dx_i \qquad (11)$$

The sum of the $F_{max}$ and $\Delta F$ obtained by integrating $\eta(x_i, x_d)$ of the displacement decrease region becomes a load F.

$$F = F_{max} + \int_{X}^{X-\Delta X} dx_d \int_{-X_s}^{X_s} \eta(x_i, x_d) dx_i = \qquad (12)$$

-continued $$F_{max} - \int_{X-\Delta X}^{X} dx_d \int_{-X_s}^{X_s} \eta(x_i, x_d) dx_i$$

A hatched part is reduced from the position of $X_s$ of (4) in FIG. 7(b) to 0 of (5), and then reduced to $-X_s$ of (6) in FIG. 7(c), becoming a minimum value $F_{min}$ of F.

The foregoing is a concept of the hysteretic characteristic representation by the Preisach model.

Figure 8A:
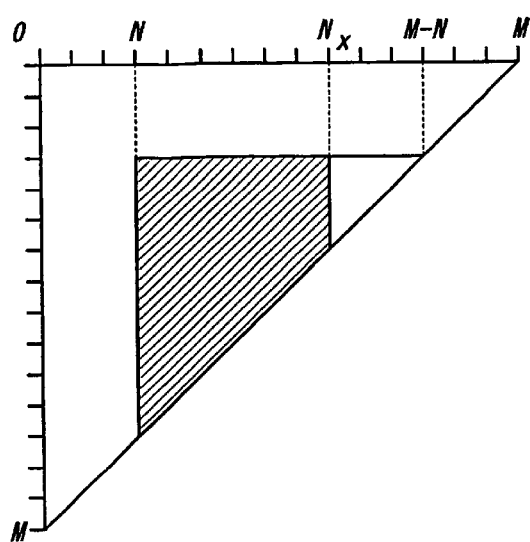
FIGS. 8(a) and 8(b) are views showing an area of matched addition of a distribution function table by discrete values.

The representation of the foregoing by discrete values is as follows. That is, it is assumed that the number of divisions in the distribution function represented by discrete values is M, and amplitude X as an input maximum value is present in the Nth division. When the displacement is increased by $\Delta X$ from X at the Nth division, if the position of the division having $\Delta X$ is $N_x$, a change in the load with respect to the increase of the displacement may be like that shown in FIG. 8(a), and represented as follows.

$$F_{min} = -\frac{1}{2}\sum_{x_i=0}^{M-2}\sum_{x_d=0}^{M-2N} \eta(x_i, x_d) \quad (13)$$

$$F = F_{min} + \sum_{x_i=N}^{N_x-N}\sum_{x_d=N}^{M-2N} \eta(x_i, x_d) \quad (14)$$

Figure 8B:
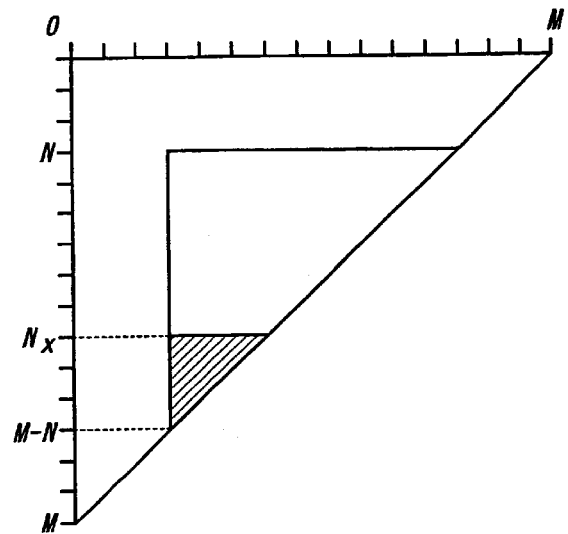

Similarly, when the displacement is decreased by $\Delta X$ from X at the Nth division, if the position of the division having $\Delta X$ is Nx, a change in the load with respect to the decrease of the displacement may be like that shown in FIG. 8(b), and represented as follows.

$$F_{max} = \frac{1}{2}\sum_{x_i=0}^{M-2N}\sum_{x_d=0}^{M-2N} \eta(x_i, x_d) \quad (15)$$

$$F = F_{max} + \sum_{x_i=N}^{M-2N}\sum_{x_d=N}^{N_x-N} \eta(x_i, x_d) \quad (16)$$

Figure 9:
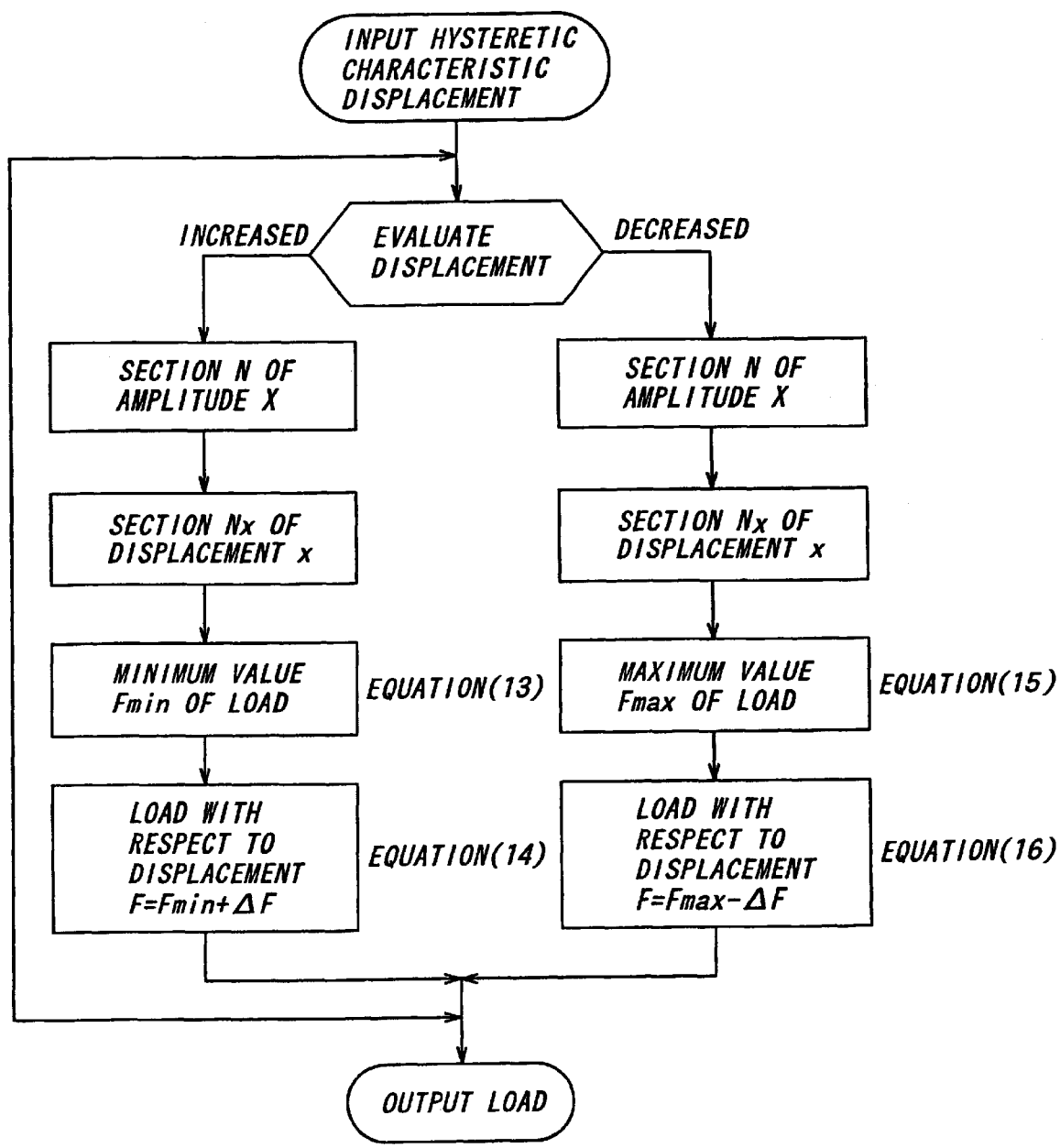
FIG. 9 is a flowchart showing a process for representing a hysteretic characteristic by a discrete value.

The flowchart of the entire process of the hysteretic characteristic representation by such discrete values is shown in FIG. 9.

Figure 10:
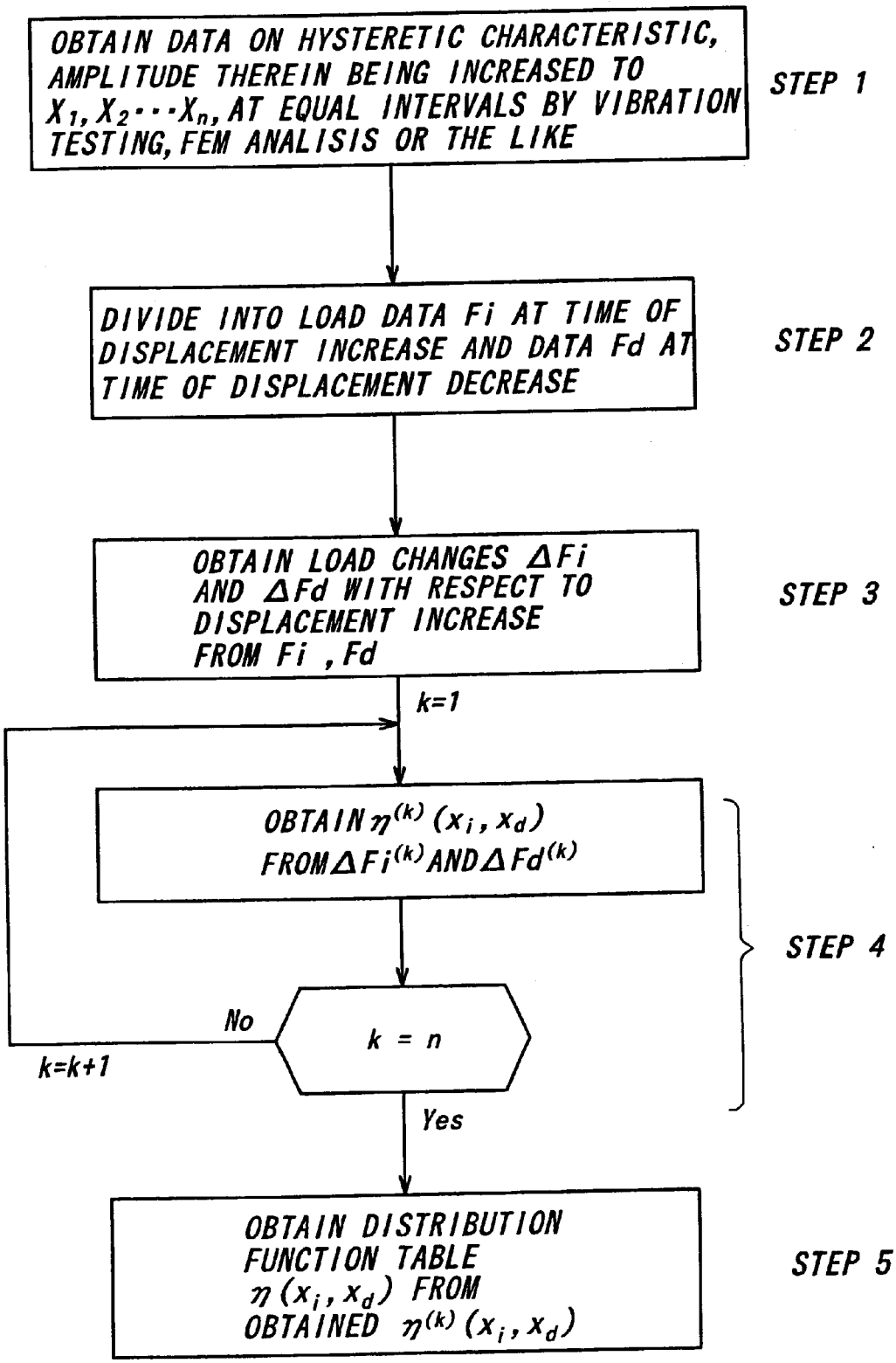
FIG. 10 is a flowchart showing an algorithm for making a distribution function table from vibration test data.

Now, the process of representing the hysteretic characteristic will be described in detail with reference to a flowchart shown in FIG. 10.

(Step 1)

Figure 11:
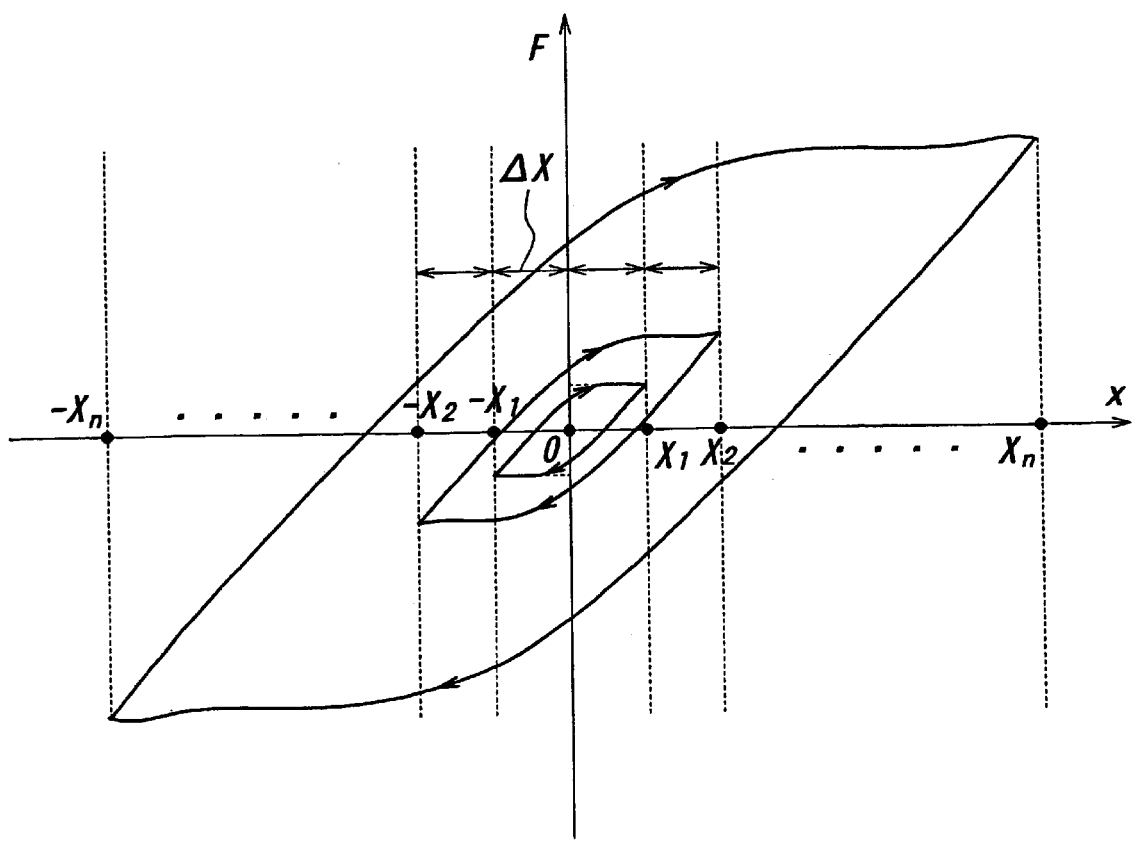
FIG. 11 is a view illustrating a data acquisition point when making the distribution function.

Consideration is given to a plane $x_i$-$x_d$ regarding the displacement $x_i$ at the time of increase and the displacement $x_d$ at the time of decrease. By a vibration test, FEM analysis or the like, regarding a loop of the hysteretic characteristic of a target test piece such as a rubber pad, as shown in FIG. 11, data is obtained, in which the amplitude of the loop is increased to $X_1, X_2, \ldots, X_n$ at equal intervals $\Delta X$. Then, the values of loads are obtained with respect to the displacement values $-X_n, -X_{n-1}, \ldots, -X_1, 0, X_1, X_2, \ldots, X_n$ of the hysteretic characteristic data. If there are no load data at the displacement values $-X_n, -X_{n-1}, \ldots, -X_1, 0, X_1, X_2, \ldots, X_n$, the load data is obtained by interpolating data.

(Step 2)

The above hysteretic characteristic data is divided into load data at the time of displacement increase and load data at the time of displacement decrease. Regarding the displacement increase at amplitude $X_k$ (k=1, 2, . . . , n) and loads at the time of displacement increase, if a load at the minimum value $-X_k$ of the amplitude is $F_{-k, 2k}$, and a load at a maximum value $X_k$ is $F_{k, 2k}$, then 2k+1 pieces of data are represented as follows:

$$x_i^{(k)} = [-X_k, -X_{k-1}, \ldots, -X_1, X_0, X_1, X_2, \ldots, X_k](X_0=0) \quad (17)$$

$$F_i^{(k)} = [F_{-k, 2k}, F_{k, 1}, F_{k, 2}, \ldots, F_{k, 2k}] \quad (18)$$

Loads at the time of displacement decrease with respect to displacement decrease are represented as follows:

$$X_d^{(k)} = [X_k, X_{k-1}, \ldots, -X_1, X_0, -X_1, -X_2, \ldots, -X_k](X_0=0) \quad (19)$$

$$F_d^{(k)} = [F_{k, 2k}, F_{-k, 1}, F_{-k, 2}, \ldots, F_{-k, 2k}] \quad (20)$$

(Step 3)

A change $\Delta F_i$ in load is obtained with respect to a displacement increase. The change $\Delta Fi$ is represented as follows:

$$\Delta F_i^{(k)} = [F_{ik,1}, F_{ik,2}, \ldots, F_{ik,2k}] \quad (21)$$
$$= [F_{k,1} - F_{-k,2k}, F_{k,2} - F_{k,1}, F_{k,3} -$$
$$F_{k,2}, \ldots, F_{k,2k} - F_{k,2k-1}]$$

A change $\Delta F_d$ in load is obtained with respect to a displacement decrease. The change $\Delta F_d$ is represented as follows:

$$\Delta F_d^{(k)} = [F_{dk,1}, F_{dk,2}, \ldots, F_{dk,2k}] \quad (22)$$
$$= [F_{-k,1} - F_{k,2k}, F_{-k,2} - F_{-k,1}, F_{-k,3} -$$
$$F_{-k,2}, \ldots, F_{-k,2k} - F_{-k,2k-1}]$$

(Step 4)

By use of the above load changing quantities with respect to the displacement changes, $\eta(x_i, x_d)$ is obtained by processing $\Delta F_i$ and $\Delta F_d$ sequentially from k=1 to k=n as follows. There are three $\eta(x_i, x_d)$ at k=1, and represented as follows:

$$\eta^{(1)}(x_i, x_d) = [\eta(X_0, X_1), \eta(-X_1, X_1), \eta(-X_1, X_0)] \quad (23)$$
$$= [F_{i12}, F_{d11} - F_{i12}, F_{d12}]$$
$$= [F_{i12}, F_{d11} - \eta(X_0, X_1), F_{d12}]$$

There are seven $\eta(x_i, x_d)$ at k=2, which are represented as follows by using $F_{i12}, F_{i11}, F_{d12}$, and $F_{d11}$ obtained at k=1:

$$\eta^{(2)}(x_i, x_d) = [\eta(X_1, X_2), \eta(X_0, X_2), \eta(-X_1, X_2), \eta(-X_2, X_2), \eta(-X_2, -X_1), \eta(-X_2, X_0), \eta(-X_2, X_1)]$$

$$= [F_{i24}, F_{i23} - F_{i12}, F_{i22} - F_{i11}, F_{i21} - [\eta(X_1, X_2) + \eta(X_0, X_2) + \eta(-X_1, X_2)], F_{d22} - F_{d11}, F_{d23} - F_{d12}, F_{d24}] \quad (24)$$

Similarly, there are 4n−1 pieces of $\eta(x_i, x_d)$ at k=n, which are represented as follows by using $F_{in-1, 2n-2}, F_{in-1, 2n-3}, F_{in-1, 1}, F_{dn-1, 1}, F_{dn-1, 2n-3}, F_{dn-1, 2n-2}$ obtained at k=n−1.

$$\left.\begin{array}{l}\eta(X_{n-1}, X_n) = F_{in,2n},\\ \eta(-X_n, -X_{n-1}) = F_{dn,2n},\\ \eta(-X_n, X_{n-1}) = F_{in1} - \{\eta(X_{n-1}, X_n) + \eta(X_{n-2}, X_n) + \ldots + \eta(-X_n, X_n)\}\end{array}\right\} \quad (25)$$

$\eta^{(n)}(x_i, x_d) = [\eta(X_{n-1}, X_n), \eta(X_{n-2}, X_n), \ldots, \eta(-X_n, X_n), \eta(-X_n, X_{n-1}), \ldots, \eta(-X_n, X_{n-1})]$ $= [F_{in, 2n},$ $F_{in, 2n-1} - F_{in-1, 2n-2},$ $F_{in, 2n-2} - F_{in-1, 2n-3}, \ldots,$ $F_{in2} - F_{in-1, 1},$ $F_{in1} - \{(\eta(X_{n-1}, X_n) + \eta($ $X_{n-2}, X_n) + \ldots + \eta(-$ $X_n, X_n)\}, F_{dn, 2} - F_{dn-1, 1}, \ldots,$ $F_{dn, 2n-2} - F_{dn-1, 2n-3},$ $F_{dn, 2n-1} - F_{dn-1, 2n-2},$ $F_{dn, 2n}]$ \hfill (26)

(Step 5)
By representing the foregoing as follows, a Preisach distribution function table showing the hysteretic characteristic model is obtained:

$$\eta(x_i, x_d) = \begin{bmatrix} \eta(-X_n, X_n) & \eta(-X_{n-1}, X_n) & \cdots & \eta(-X_1, X_n) & \eta(X_1, X_n) & \eta(X_1, X_n) & \cdots & \eta(X_{n-1}, X_n) \\ \eta(-X_n, X_{n-1}) & \ddots & \vdots & \vdots & \vdots & \vdots & \ddots & 0 \\ \vdots & \cdots & \eta(-X_2, X_2) & \eta(-X_1, X_2) & \eta(X_0, X_2) & \eta(X_1, X_2) & 0 & \\ \eta(-X_n, X_1) & \cdots & \eta(-X_2, X_1) & \eta(-X_1, X_1) & \eta(X_0, X_1) & 0 & & \\ \eta(-X_n, X_0) & \cdots & \eta(-X_2, X_0) & \eta(-X_1, X_0) & 0 & & & \vdots \\ \eta(-X_n, -X_1) & \cdots & \eta(-X_2, -X_1) & 0 & & \ddots & & \\ \vdots & \ddots & 0 & & & & \ddots & \\ \eta(-X_n, -X_{n-1}) & 0 & & \cdots & & & & 0 \end{bmatrix} \quad (27)$$

Figure 13B:
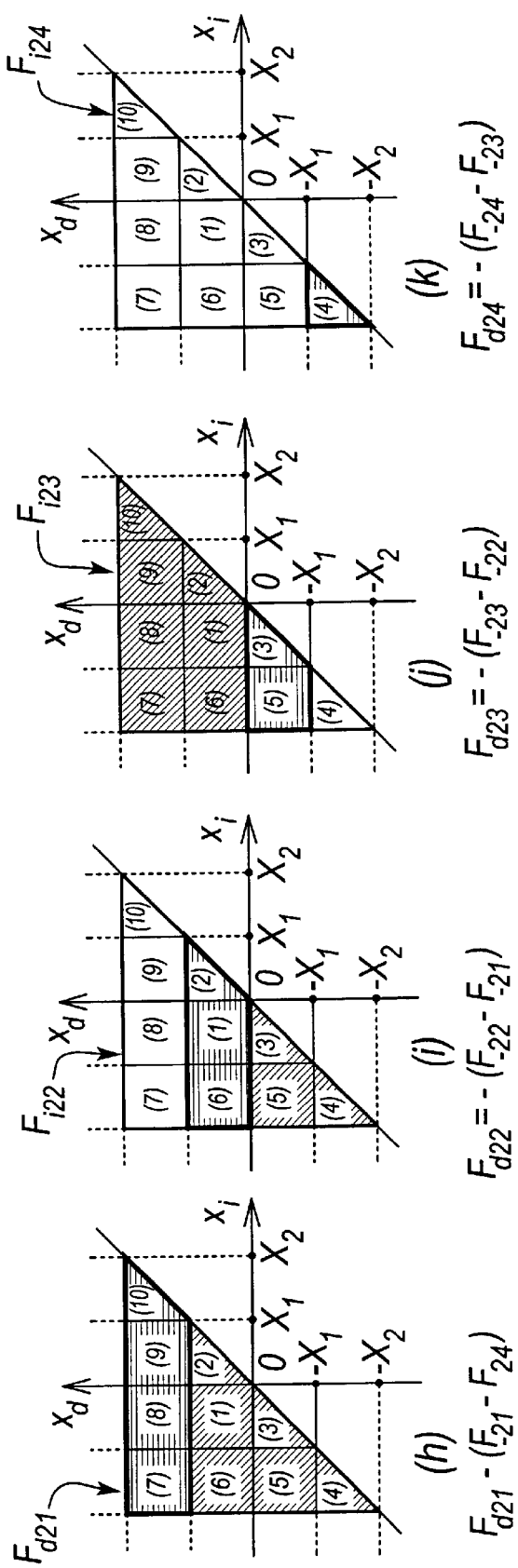

Each of FIGS. 12 and 13 shows a process when the amplitude of displacement is increased from $X_1$ to $X_2$. This process will now be described.

[1] If a load increase $\Delta F$ is set as $F_{i11}$ when the displacement is increased from $-X_1$ to 0, and loads are respectively $F_{-12}$ and $F_{11}$ at $-X_1$ and 0, $F_{i11}$ becomes a hatched part (1)+(3) of FIG. 12(a).

$F_{i11} = F_{11} - F_{-12}$ \hfill (28)

[2] If a load increase is $F_{i12}$ when the displacement is increased to $X_1$, a load is $F_{12}$ at $X_1$, $F_{i12}$ becomes (1)+(2)+(3), and the value of (2) is decided as shown in FIG. 12(b).

$F_{i12} = F_{12} - F_{11}$ \hfill (29)

$\eta(X_0, X_1) = F_{i12}$ \hfill (30)

[3] Then, if a load decrease is $F_{d11}$ when the displacement is decreased from $X_1$ to 0, and a load is $F_{-11}$ at 0, $F_{d11}$ becomes (1)+(2) of FIG. 12(c), and the value of $\eta(-X_1, X_0)$ is decided.

$F_{d11} = -(F_{-11} - F_{12})$ \hfill (31)

$\eta(-X_1, X_0) = F_{d12}$ \hfill (32)

Then, the value of $\eta(-X_1, X_1)$ of (1) is obtained from the obtained $\eta(X_0, X_1)$ of (2).

$F_{d12} = -(F_{-12} - F_{-11})$ \hfill (33)

$\eta(-X_1, X_1) = F_{d11} - F_{i12}$ \hfill (34)

[4] Similarly, the following process is carried out for the amplitude $X_2(X_2 > X_1)$ of a next one cycle.

As shown in FIG. 13(d), if loads are respectively $F_{-24}$ and $F_{21}$ at $-X_2$ and $-X_1$, a load change $F_{i21}$ when the displacement is increased from $-X_2$ to $-X_1$ becomes the added value of (4) to (7).

$F_{i21} = F_{21} - F_{-24}$ \hfill (35)

[5] If a load is $F_{22}$ at the displacement of 0, a load change $F_{i22}$ when the displacement is increased from $-X_1$ to 0 becomes the added value of (1), (3) and (4) to (8). Since the added value of (1), (3), and (4) to (7) can be obtained, $\eta(-X_2, -X_1)$ of (8) is obtained therefrom as shown in FIG. 13(e).

$F_{i22} = F_{22} - F_{21}$ \hfill (36)

$\eta(-X2, -X1) = F_{d22} - F_{i11}$ \hfill (37)

[6] If a load is $F_{23}$ at $X_1$, a load change $F_{i23}$ when the displacement is increased from 0 to $X_1$ becomes the added value of (1) to (9). Since the added value of (1) to (8) can be obtained, the value $\eta(-X_2, X_0)$ of (9) is decided as shown in FIG. 13(f).

$F_{i23} = F_{23} - F_{22}$ \hfill (38)

$\eta(-X_2, X_0) = F_{i23} - F_{i12}$ \hfill (39)

[7] If a load is $F_{24}$ at $X_2$, a load change $F_{i23}$ when the displacement is increased from $X_1$ to $X_2$ becomes the added value of (1) to (10). Since the added value of (1) to (9) can be obtained, the value $\eta(-X_2, X_1)$ of (10) is obtained therefrom as shown in FIG. 13(g).

$F_{i24} = F_{24} - F_{23}$ \hfill (40)

$\eta(-X_2, X_1) = F_{i24}$ \hfill (41)

[8] If a load is $F_{-21}$ at $X_1$, a load change $F_{d21}$ when the displacement is decreased from $X_2$ to $X_1$ becomes the added value of (7) to (10). Since the added value of (8) to (10) can be obtained, the value $\eta(-X_2, X_2)$ of (7) is obtained therefrom as shown in FIG. 13(h).

$$F_{d21}=-(F_{-21}-F_{24}) \tag{42}$$

$$\eta(-X_2, X_2)=F_{d21}-(\eta_8+\eta_9+\eta_{10}) \tag{43}$$

[9] If a load is $F_{-22}$ at the displacement of 0, a load change $F_{d22}$ when the displacement is decreased from X1 to 0 becomes the added value of (1), (2), (6) and (7) to (10). Since the added value of (1), (2) and (7) to (10) can be obtained, the value $\eta(-X_1, X_2)$ of (6) is obtained therefrom as shown in FIG. 13(i).

$$F_{d22}=-(F_{-22}-F_{-21}) \tag{44}$$

$$\eta(-X_1, X_2)=F_{d22}-F_{d11} \tag{45}$$

[10] If a load is $-F_{23}$ at $-X_1$, a load change $F_{d23}$ when the displacement is decreased from 0 to $-X_1$ becomes the added value of (1) to (3) and (5) to (10). Since the added value of (1) to (3) and (6) to (10) is obtained, the value $\eta(X_0, X_2)$ of (5) can be obtained therefrom as shown in FIG. 13(j).

$$F_{d23}=-(F_{-23}-F_{-22}) \tag{46}$$

$$\eta(X_0, X_2)=F_{d23}-F_{d12} \tag{47}$$

[11] If a load is $-F_{24}$ at $-X_2$, a load change $F_{d24}$ when the displacement is decreased from $-X_1$ to $-X_2$ becomes the added value of (1) to (10). Since the added value of (1) to (3) and (5) to (10) can be obtained, the value $\eta(X_1, X_2)$ of (4) is obtained therefrom as shown in FIG. 13(k).

$$F_{d24}=-(F_{-24}-F_{-23}) \tag{48}$$

$$\eta(X_1, X_2)=F_{d24} \tag{49}$$

In the above-described process, amplitude is increased as $X_1, X_2, X_3, \ldots$, ($X_1<X_2<X_3<\ldots$) and, by repeating the processing until desired displacement amplitude is reached, a distribution function table can be formed.

When a hysteretic characteristic model is made based on the data of the hysteretic characteristic obtained from the vibration test by the method of the invention, a more detailed hysteretic characteristic model can be made by two-dimensionally interpolating the Preisach distribution function table using a spline function or the like.

Figure 14:
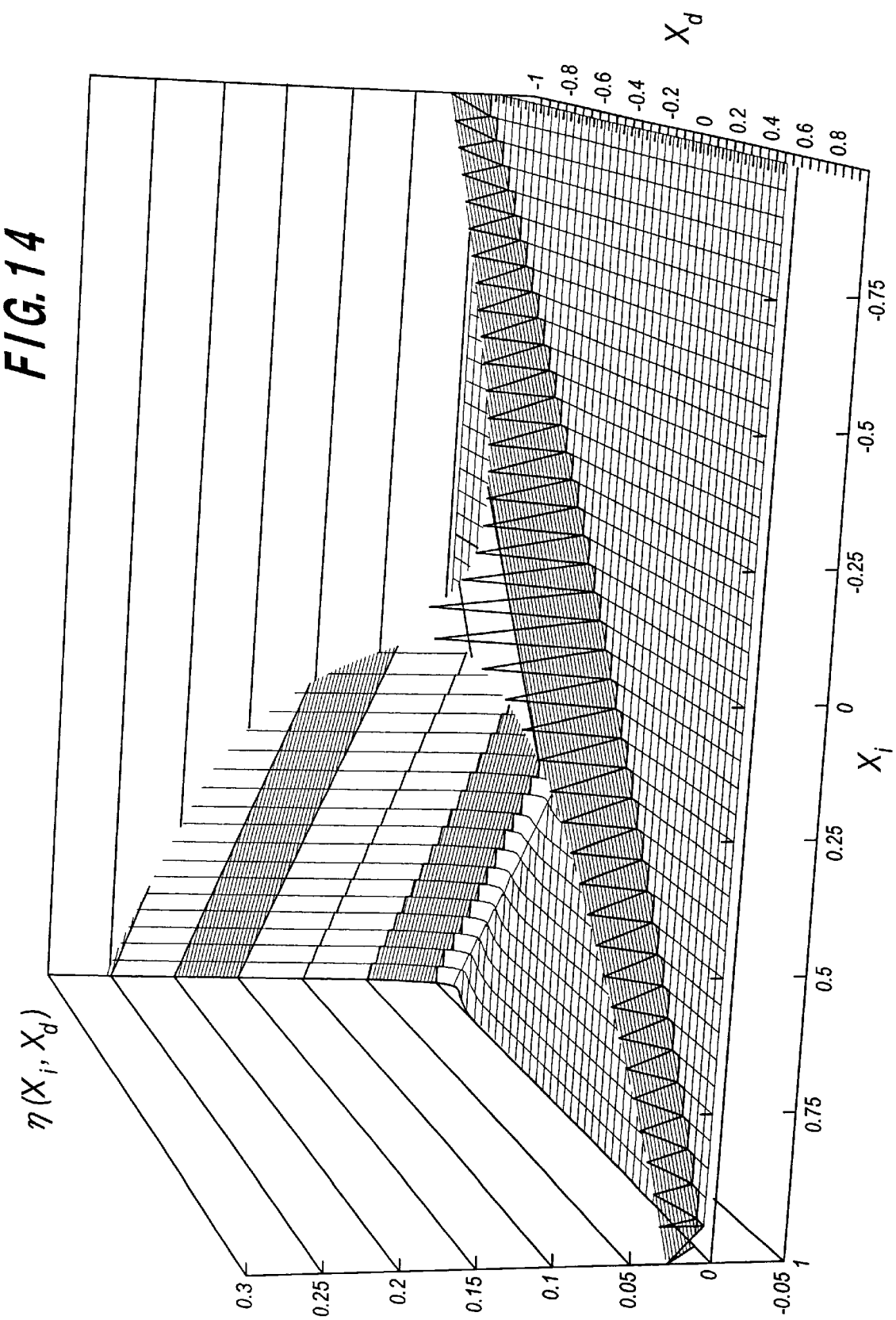
FIG. 14 is a view illustrating Preisach distribution function formed from numerical model data, seen in a three-dimensional space.
Figure 15:
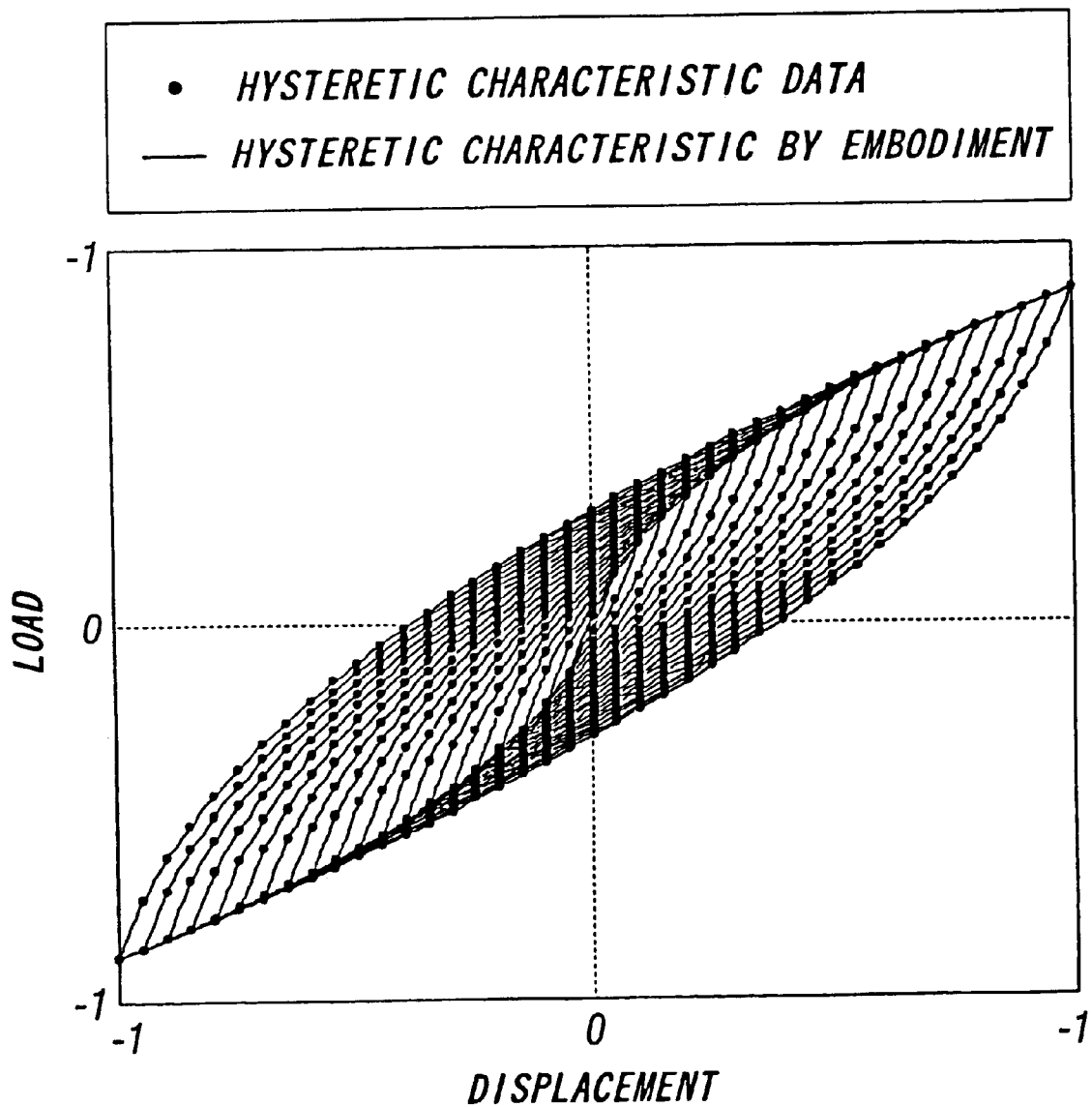
FIG. 15 is a view illustrating hysteretic characteristic data formed by a numerical model, and a hysteretic characteristic by Preisach model.

By using the method of step 1, displacements x were provided from $-1$ to 1 by 0.05 to the hysteretic characteristic of the Ramberg-Osgood type represented by (50), (51), and (52), $\alpha=4$, $\beta=1$ and $\gamma=2$ were set, and a distribution function table was formed from loads F obtained therefrom. The result is shown in FIG. 14. In addition, the hysteretic characteristic obtained from the distribution function is shown in FIG. 15.

$$\text{Skeleton curve: } x=\alpha F+\beta F^\gamma \tag{50}$$

$$\text{Force increase line: } \frac{x+x_0}{2} = \alpha\frac{F+F_0}{2} + \beta\left(\frac{F+F_0}{2}\right)^\gamma \tag{51}$$

$$\text{Force reduction line: } \frac{x-x_0}{2} = \alpha\frac{F-F_0}{2} + \beta\left(\frac{F-F_0}{2}\right)^\gamma \tag{52}$$

Figure 16:
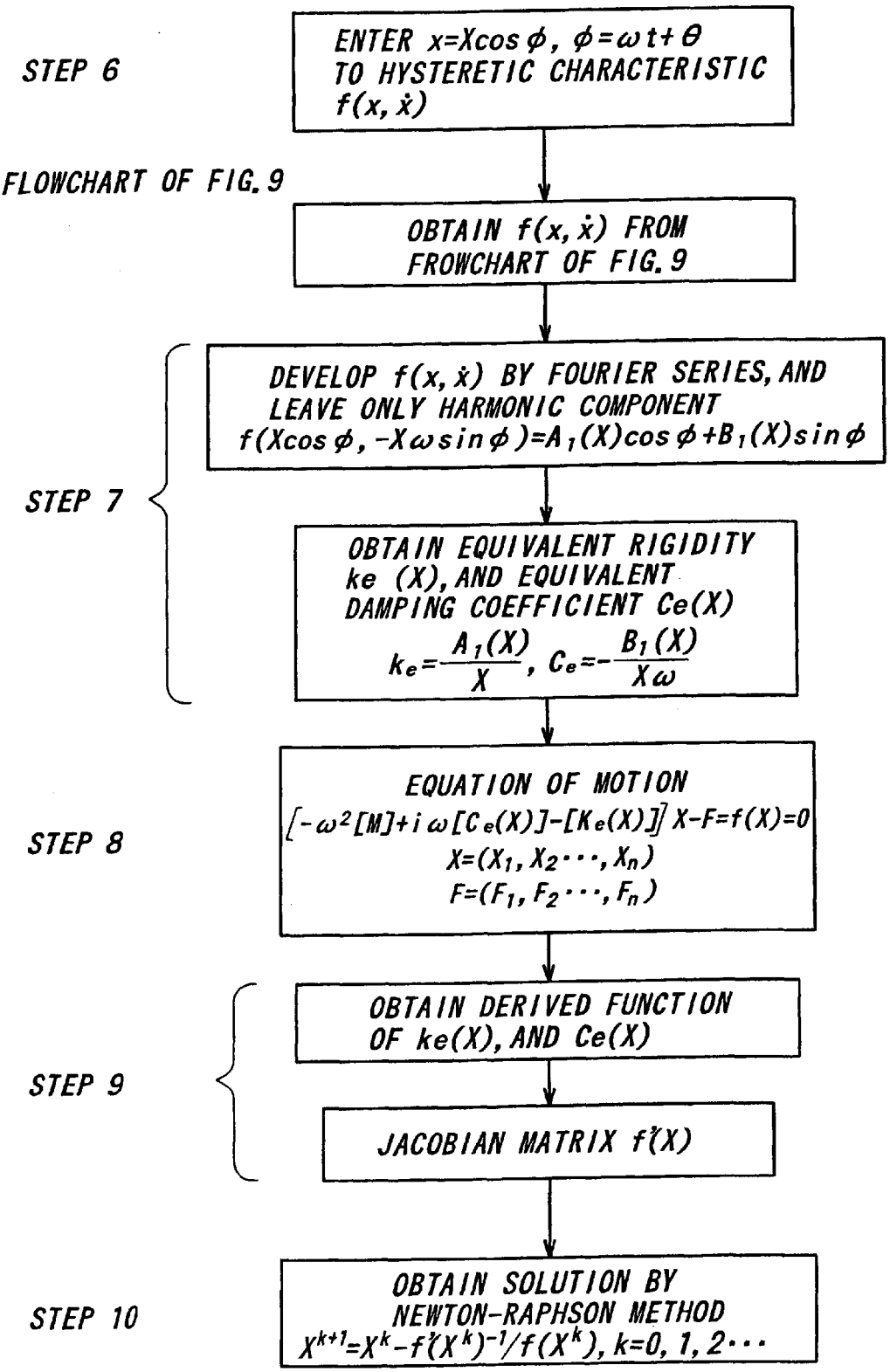
FIG. 16 is a flowchart showing a process for obtaining a solution of a multi-degree-of-freedom nonlinear simultaneous equation.

Next, description will be made on a frequency response characteristic analysis by an equivalent linearization method of a system having the hysteretic characteristic obtained from the above-described Preisach model. In this case, a solution is found to multi-degree-of-freedom nonlinear simultaneous equations by a procedure shown in FIG. 16.

(Step 6)

An equation of motion in the nonlinear system with hysteresis in rigidity is represented as follows.

$$m\ddot{x}+f(x, \dot{x})=F \cos \omega t \tag{53}$$

Hereinafter, $\ddot{x}$ is denoted by Ax; and $\dot{x}$ by Bx.

Considering that the hysteretic characteristic is represented by $f(x, Bx)$, a solution to the equation of motion is set approximately as follows:

$$x=X \cos \phi, \phi=\omega t+\theta \tag{54}$$

An output $f(x, Bx)$ with respect to the hysteretic characteristic becomes a $2\pi$-periodic function with respect to $\phi$.

The output of the Preisach model with respect to an input represented by the equation (54) is obtained by each of (13), (14), (15) and (16) (see FIGS. 4(a) to 4(c)).

(Step 7)

The above output is subjected to Fourier development by the FFT, and a harmonic content left is represented as follows:

$$f(X \cos \phi, -X\omega \sin \theta)=A_1(X)\cos \phi+B_1(X)\sin \phi \tag{55}$$

$$A_1(X) = \frac{1}{2\pi}\int_0^{2\pi} f(X\cos\phi, -X\omega\sin\phi)\cos\phi\, d\phi \tag{56}$$

$$B_1(X) = \frac{1}{2\pi}\int_0^{2\pi} f(X\cos\phi, -X\omega\sin\phi)\sin\phi\, d\phi \tag{57}$$

If the equation of motion is replaced by an equivalent linear system using the above, it is represented as follows:

$$m\ddot{x}+c_e(X)\dot{x}+k_e(X)x=F \cos \omega t \tag{58}$$

Here, equivalent rigidity and an equivalent damping coefficient are represented as follows:

$$k_e(X) = \frac{A_1(X)}{X}, \quad c_e(X) = -\frac{B_1(X)}{X\omega} \tag{59}$$

By calculating the equation (59) and then solving the equation (58), an approximate solution can be found.

Since the output (55) obtained from the hysteretic characteristic represented by the Preisach model with respect to the input of the equation (54) takes discrete values, Fourier coefficient (56), (57) thereof are numerically obtained. Thus, the equation (59) is obtained.

In the described embodiment, $k_e(X)$ and $c_e(X)$ in a range of X available in the equation (59) are obtained beforehand. The range of X, and $k_e(X)$ and $c_e(X)$ are represented as follows:

$$X=[X_1, X_2, \ldots, X_n] \tag{60}$$

$$k_e(X)=[k_e(X_1), k_e(X_2), \ldots, k_e(X_n)] \tag{61}$$

$$c_e(X)=[c_e(X_1), c_e(X_2), \ldots, c_e(X_n)] \tag{62}$$

Since it is not necessary to calculate the equation (55) for the equation (54) obtained at each convergent calculation, calculation efficiency is improved.

(Step 8)

From the equation (58), amplitude and phase of this harmonic vibration are obtained from the following equation.

$$X\sqrt{\{k_e(X) - m\omega^2\}^2 + \{c_e(X)\omega\}^2} - F = 0 \qquad (63)$$

$$\phi = \tan^{-1}\frac{c_e(X)\omega}{k_e(X) - m\omega^2} \qquad (64)$$

This method is applied to the multi-degree-of-freedom system. If $[M]$ is set as a mass matrix; $[C_e(X)]$ as a matrix composed of equivalent damping coefficients $Ce(X)$; and $[K_e(X)]$ as a matrix composed of equivalent rigidity coefficients $K_e(X)$, then the equation of motion is represented as follows:

$$[-\omega^2[M] + i\omega[C_e(X)] + [K_e(X)]]X - F = [0] \qquad (65)$$

X and F become vectors as follows:

$$X = (X_1, X_2, \ldots, X_n) \qquad (66)$$

$$F = (F_1, F_2, \ldots, F_n) \qquad (67)$$

Hereinafter, X is denoted by VX, and F by VF.

(Step 9)

When the Newton-Raphson method is applied to these simultaneous equations, $C_e(X)$ and $K_e(X)$ respectively constituting $[C_e(X)]$ and $[K_e(X)]$ become functions of displacement amplitude X. Accordingly, to obtain a Jacobian matrix thereof, it is necessary to obtain a derived function of the equivalent damping coefficient $c_e(X)$ and the equivalent rigidity coefficient $k_e(X)$.

Thus, according to the embodiment, interpolation is carried out based on a spline function of a piecewise polynomial for the obtained $[C_e(X)]$ and $[K_e(X)]$, and a derived function is obtained by differentiating this spline function.

If $\alpha_i$ is a constant coefficient, and $p(x)$ is an mth order polynomial, an mth order spline function having N points of contact $x = X_0, X_1, \ldots, X_{N-1}$ is represented by the following equation (68).

$$s(x) = p(x) + \sum_{i=0}^{N-1} \alpha_i (x - X_i)_+^m \qquad (68)$$

Figure 17:
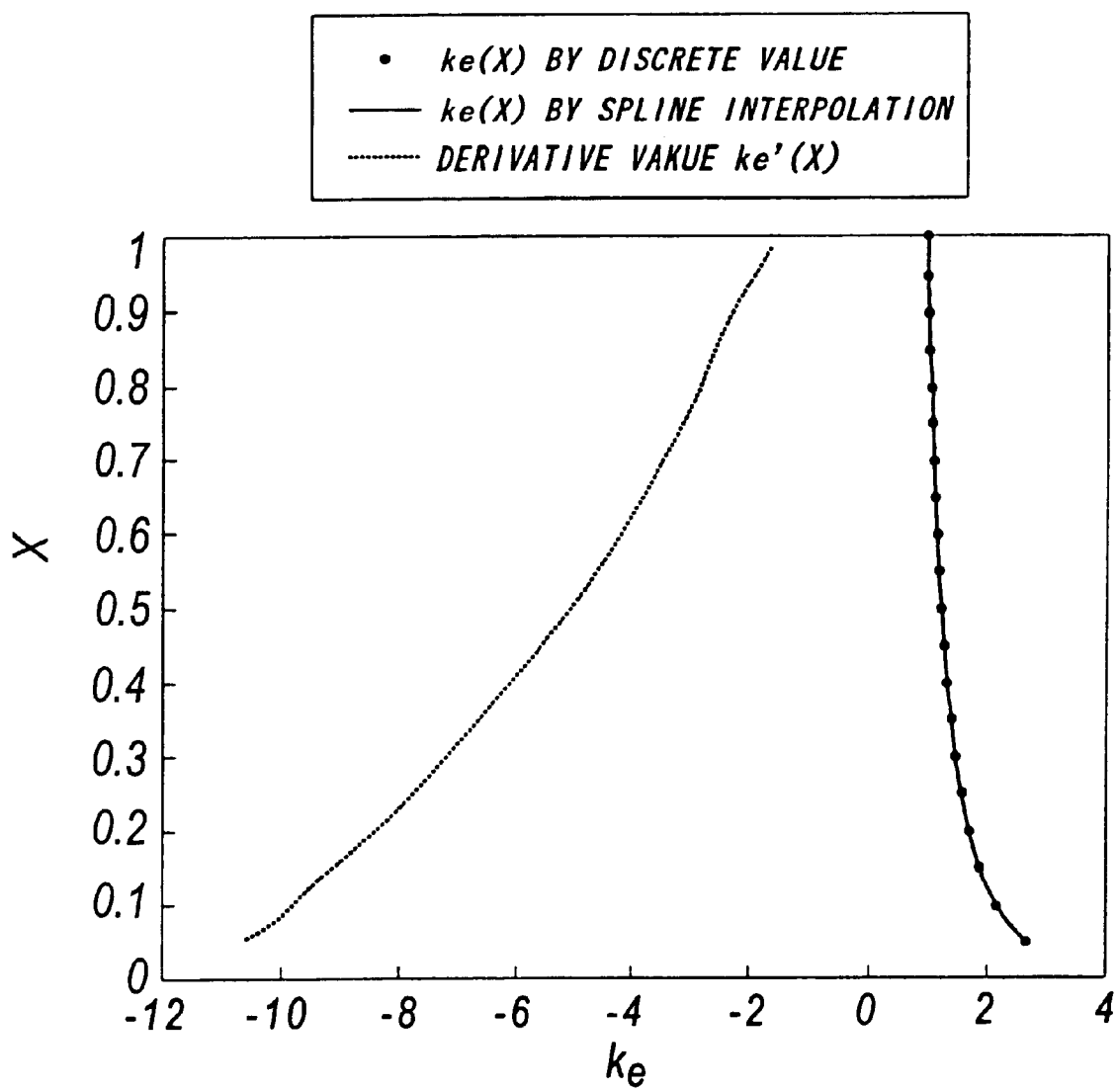
FIG. 17 is a characteristic line view showing an example of an equivalent rigidity coefficient $k_e(X)$ and a differential value $k_e'(X)$ thereof.

Since the piecewise polynomial is differentiable, the derivative of the mth order spline function is obtained by the following equation (See FIG. 17).

$$\frac{d}{dx}(x - X_i)_+^m = m(x - X_i)_+^{m-1} \qquad (69)$$

By using this method, the derivatives of the factors of $[C_e(X)]$ and $[K_e(X)]$ are obtained, a Jacobian matrix $f'(VX)$ of the equation of motion $f(VX)$ is formed.

$$f'(X)^{-1} = \begin{bmatrix} \frac{\partial f_1}{\partial X_1} & \frac{\partial f_1}{\partial X_2} & \cdots & \frac{\partial f_1}{\partial X_n} \\ \frac{\partial f_2}{\partial X_1} & \frac{\partial f_2}{\partial X_2} & \cdots & \frac{\partial f_1}{\partial X_n} \\ \vdots & \vdots & \ddots & \vdots \\ \frac{\partial f_n}{\partial X_1} & \frac{\partial f_n}{\partial X_2} & \cdots & \frac{\partial f_n}{\partial X_n} \end{bmatrix} \qquad (70)$$

(Step 10)

If a Newton-Raphson method is applied to the equation (65), the following is established:

$$[-\omega^2[M] + i\omega[C_e(X)] + [K_e(X)]]X - F = f(X) = 0 \qquad (71)$$

An approximate solution $X^{k+1}$ of K+1 th time with respect to $X^k$ of Kth time is represented as follows:

$$X^{k+1} = X^k - f'(X^k)^{-1}/f(X^k), k = 0, 1, 2, \ldots \qquad (72)$$

Figure 18:
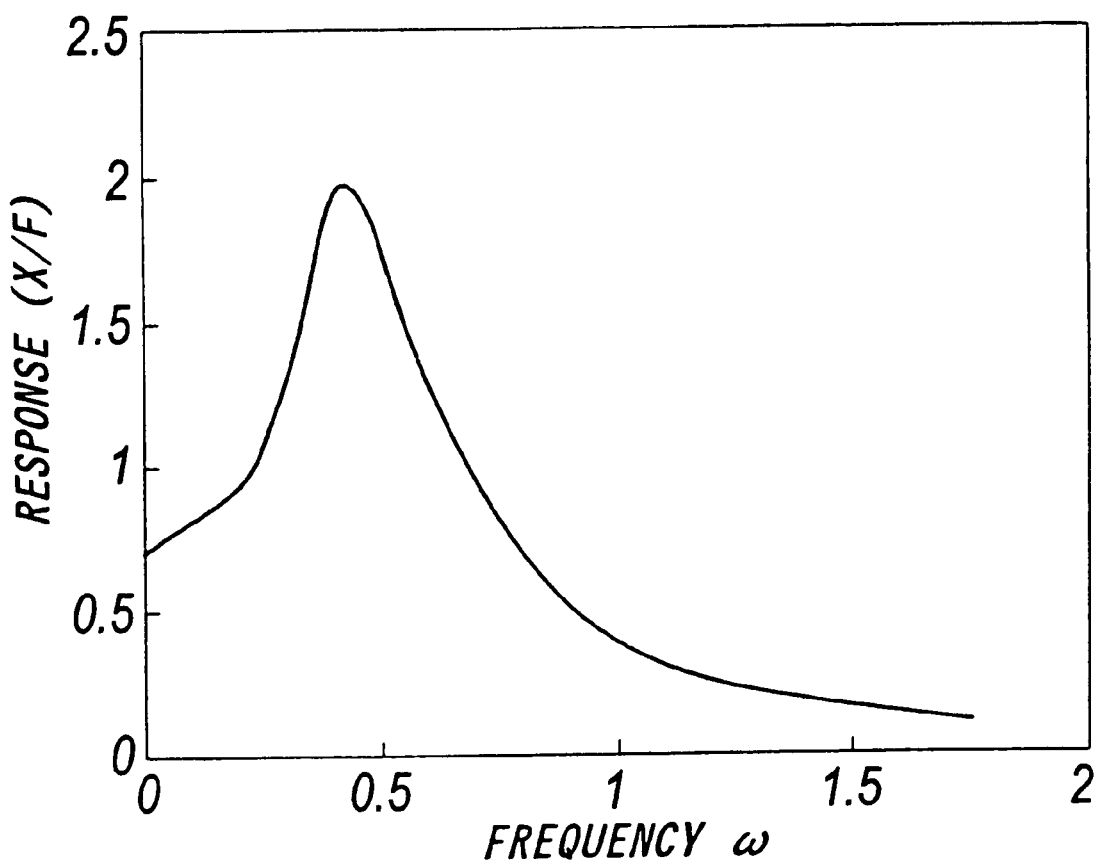
FIG. 18 is a characteristic line view showing an example of a frequency response characteristic of single-degree-of-freedom system with hysteresis.
Figure 19:
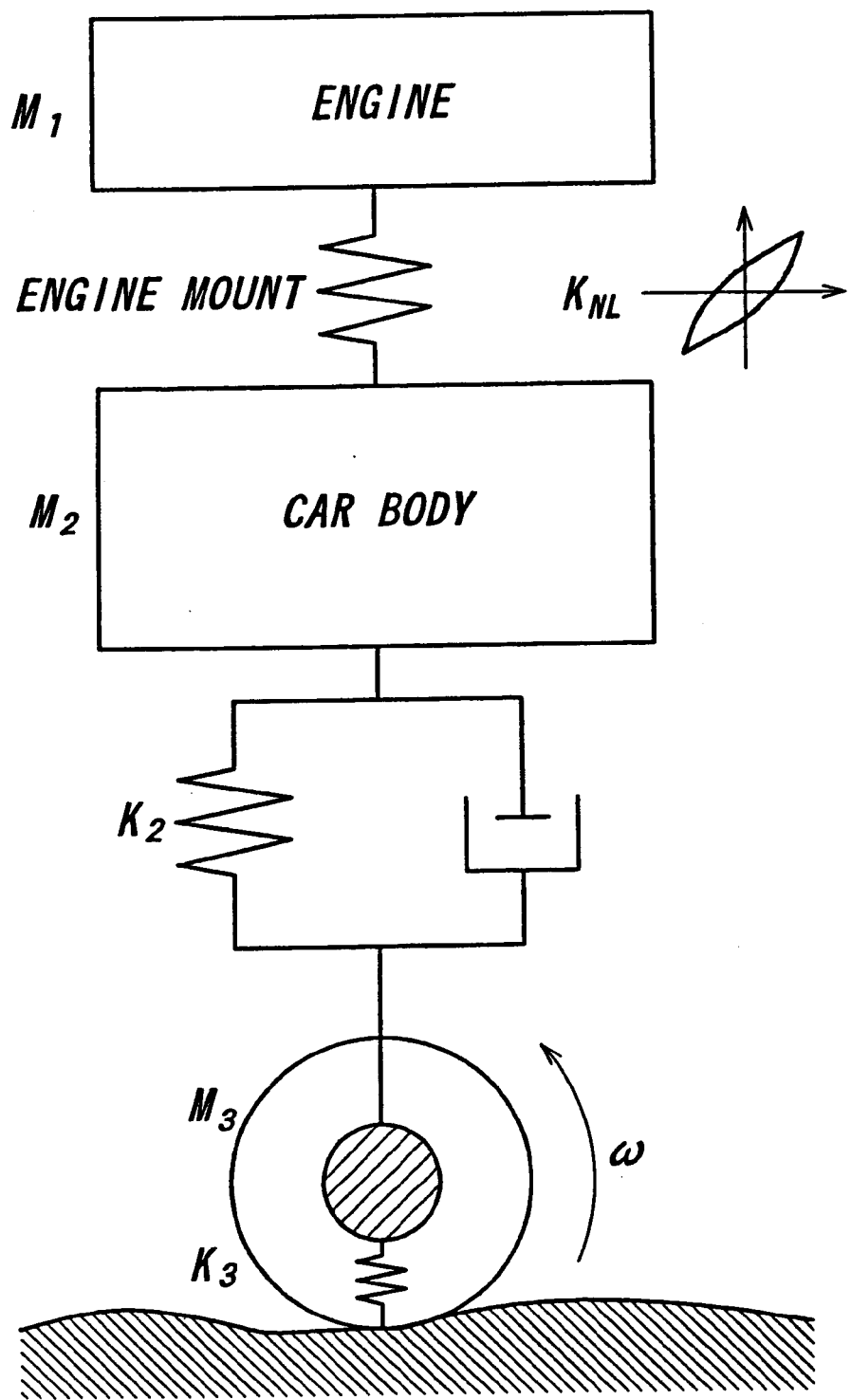
FIG. 19 is a view illustrating an engine shake model having an engine mount as an example of a machine structure system with nonlinear restoring force characteristic ($K_{NL}$).

A solution is found by repeating the equation (72). By carrying out this calculation for each $\omega$ of the equation (65), a frequency response characteristic like that shown in FIG. 18 is obtained.

What is claimed is:

1. A method for analyzing nonlinear restoring force characteristic with hysteresis of a machine structure system, comprising:

performing approximate mode analysis by representing said nonlinear restoring force characteristic with hysteresis by an equivalent linear characteristic, when a nonlinear restoring force characteristic of a machine structure system, having force-displacement hysteresis, is analyzed, wherein the representation of the nonlinear restoring force characteristic by said equivalent linear characteristic includes the steps of:

first obtaining a basic nonlinear restoring force characteristic experimentally or simulatively based on a relation between an input and an output of an actual system;

then obtaining a transmission characteristic, equivalent rigidity, and equivalent viscous damping by numerical analysis based on a relation between a sine wave input with respect to said basic nonlinear restoring force characteristic and a fundamental wave frequency component of an output of the sine wave input distorted after passing through said basic nonlinear restoring force characteristic;

and obtaining a frequency response characteristic of the entire machine structure system by uniting said transmission characteristic, said equivalent rigidity and said equivalent viscous damping with a multi-degree-of-freedom equation of motion.

2. A method for analyzing nonlinear restoring force characteristic with hysteresis of a machine structure system, comprising:

performing approximate mode analysis by representing said nonlinear restoring force characteristic with hysteresis by an equivalent linear characteristic, when a nonlinear restoring force characteristic of a machine structure system, having force-displacement hysteresis, is analyzed, wherein the representation of the nonlinear restoring force characteristic by said equivalent linear characteristic includes the steps of:

first obtaining a basic nonlinear restoring force characteristic experimentally or simulatively based on a relation between an input and an output of an actual system;

then obtaining a transmission characteristic, equivalent rigidity, and equivalent viscous damping by numerical analysis based on a relation between a sine wave input with respect to said basic nonlinear restoring force characteristic and a fundamental wave frequency component of an output of the sine wave input distorted after passing through said basic nonlinear restoring force characteristic;

obtaining a frequency response characteristic of the entire machine structure system by uniting said transmission characteristic, said equivalent rigidity and said equivalent viscous damping with a multi-degree-of-freedom equation of motion; and wherein when a solution is found to a nonlinear equation of motion of said machine structure system by Newton-Raphson method, data is obtained on equivalent rigidity of a nonlinear factor, and then the data of the equivalent rigidity of the nonlinear factor is inerpolated by a piecewise polynomial.

* * * * *